(12) United States Patent
Yeh et al.

(10) Patent No.: US 12,734,985 B2
(45) Date of Patent: Sep. 15, 2026

(54) ENHANCED DISCRIMINATION METHOD AND APPARATUS FOR CONTROLLING AN ACTUATABLE PROTECTION DEVICE

(71) Applicant: ZF FRIEDRICHSHAFEN AG, Friedrichshafen (DE)

(72) Inventors: Huahn-Fern Yeh, Novi, MI (US); Charles A. Bartlett, Commerce Township, MI (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 696 days.

(21) Appl. No.: 16/525,824

(22) Filed: Jul. 30, 2019

(65) Prior Publication Data

US 2021/0031714 A1 Feb. 4, 2021

(51) Int. Cl.

| | |
|---|---|
| ***B60R 21/013*** | (2006.01) |
| ***B60R 21/205*** | (2011.01) |
| ***B60R 21/232*** | (2011.01) |
| ***G07C 5/02*** | (2006.01) |
| ***G07C 5/08*** | (2006.01) |

(52) U.S. Cl.

CPC .......... *B60R 21/013* (2013.01); *B60R 21/205* (2013.01); *G07C 5/02* (2013.01); *G07C 5/0841* (2013.01); *B60R 21/232* (2013.01)

(58) Field of Classification Search

CPC ... B60R 21/013; B60R 21/205; B60R 21/232; B60R 21/23138; B60R 21/0132–0136; B60R 2021/01302–01317; B60R 21/00–38; B60R 2021/00–346; G07C 5/02; G07C 5/0841; B60W 30/08–0956; B60W 2754/00; B60W 2552/50; B60W 2422/00; B60W 2422/90

USPC .......................................................... 701/45

See application file for complete search history.

(56) References Cited

U.S. PATENT DOCUMENTS

| | | | | |
|---|---|---|---|---|
| 5,231,253 A * | 7/1993 | Breed | H01H 35/14 | 200/61.48 |
| 5,496,979 A * | 3/1996 | Behr | G01P 15/0891 | 200/61.45 M |
| 5,935,182 A * | 8/1999 | Foo | B60R 21/0132 | 180/282 |
| 6,167,335 A * | 12/2000 | Ide | B60R 21/0133 | 701/45 |

(Continued)

FOREIGN PATENT DOCUMENTS

JP 2009214726 A * 9/2009 ......... B60R 21/0132

*Primary Examiner* — Mohamed Abdo Algehaim
(74) *Attorney, Agent, or Firm* — Tarolli, Sundheim, Covell & Tummino LLP

(57) ABSTRACT

A method for controlling an actuatable safety device for helping to protect a vehicle occupant includes sensing a plurality of vehicle acceleration parameters. The method also includes executing one or more metrics that evaluate the acceleration parameters to determine whether vehicle crash thresholds are exceeded and producing crash event indications in response thereto. The method also includes evaluating the crash event indications to identify a pole side impact, and controlling deployment of the actuatable safety device in response to identifying the pole side impact crash event. In one particular configuration, identifying the pole side impact crash event includes discriminating the pole side impact crash event from a barrier side impact crash event.

25 Claims, 7 Drawing Sheets

(56) References Cited

U.S. PATENT DOCUMENTS 6,170,864 B1* 1/2001 Fujita ................. B60R 21/0133 701/45
6,327,527 B1* 12/2001 Imai ..................... B60R 21/013 701/45
6,426,567 B2* 7/2002 Ugusa ................ B60R 21/0132 701/45
6,438,475 B1* 8/2002 Gioutsos ........... B60R 21/01558 180/274
6,487,482 B1* 11/2002 Mattes ................. B60R 21/013 701/45
6,529,810 B2* 3/2003 Foo ................... B60R 21/01336 180/282
6,644,688 B1* 11/2003 Hu ..................... B60R 21/0136 701/45
6,776,435 B2* 8/2004 Foo ..................... B60R 21/0136 701/45
6,944,525 B2* 9/2005 Miyata ................ B60R 21/0133 701/45
7,263,460 B2* 8/2007 Fendt .................. B60R 21/0132 280/735
7,278,657 B1* 10/2007 McCurdy ............ B60R 21/0134 180/282
7,475,587 B2* 1/2009 Kithil ................... G01L 5/0052 73/12.09
7,529,606 B2* 5/2009 Tustanowski ...... F02M 63/0205 701/45
7,536,247 B2* 5/2009 Clark ................ B60R 21/01332 701/45
8,118,130 B2* 2/2012 Foo ..................... B60R 21/0132 180/274
8,406,959 B2* 3/2013 Foo ..................... B60R 21/0136 340/436
9,162,642 B2* 10/2015 Clark .................. B60R 21/0132
9,725,059 B2* 8/2017 Okamura ............ B60R 21/0132
10,065,589 B2* 9/2018 Sun ....................... B60R 21/013
11,104,284 B2* 8/2021 Bartlett .............. G06K 7/10178
2001/0043011 A1* 11/2001 Ugusa ................ B60R 21/0133 307/121
2003/0176959 A1* 9/2003 Breed .................. B60N 2/0276 701/36
2004/0036261 A1* 2/2004 Breed ................. B60C 23/0408 280/735
2004/0201275 A1* 10/2004 Imai .................... B60R 21/0132 307/10.1
2005/0096881 A1* 5/2005 Watson ............... B60R 21/0136 702/190
2005/0109075 A1* 5/2005 Kithil ........................ G01L 1/16 73/12.09
2005/0155805 A1* 7/2005 Takeuchi ............ B60R 21/0132 180/282
2006/0106538 A1* 5/2006 Browne .................. B60R 21/01 701/301
2006/0254848 A1* 11/2006 Foo ..................... B60R 21/0132 180/274
2007/0228703 A1* 10/2007 Breed ..................... B60R 21/20 280/740
2008/0306996 A1* 12/2008 McClellan ............. G06Q 10/06
2009/0099734 A1* 4/2009 Le ....................... B60R 21/0132 701/46
2009/0248253 A1* 10/2009 Le ....................... B60R 21/0136 73/514.01
2009/0256339 A1* 10/2009 Mampe ............... B60R 21/0132 29/428
2010/0057288 A1* 3/2010 Foo ................... B60R 21/01336 701/31.4
2010/0057302 A1* 3/2010 Foo ..................... B60R 21/0132 701/45
2011/0040452 A1* 2/2011 Tsunekawa ......... B60R 21/0134 701/45
2011/0231067 A1* 9/2011 Itoga ................... B60R 21/0134 701/46
2012/0310485 A1* 12/2012 Lang .................. B60R 21/0132 701/1
2013/0124035 A1* 5/2013 Doerr .................. B60R 21/0132 701/32.2
2013/0320654 A1* 12/2013 Clark ................ B60R 21/01332 180/274
2014/0100710 A1* 4/2014 Clark .................. B60W 40/109 701/1
2015/0066348 A1* 3/2015 Baba ................... B60W 30/095 701/301
2015/0105982 A1* 4/2015 Okamura ............ B60R 21/0132 701/1
2015/0112552 A1* 4/2015 Okamura ............ B60R 21/0132 701/1
2015/0120147 A1* 4/2015 Okamura ............ B60R 21/0132 701/1
2015/0197207 A1* 7/2015 Clark .................. B60R 21/0136 701/1
2015/0224951 A1* 8/2015 Lang ..................... B60R 21/013 701/45
2015/0266439 A1* 9/2015 Foo ..................... B60R 21/0132 701/45
2015/0353062 A1* 12/2015 Breuer ...................... B60T 7/22 701/70
2016/0052473 A1* 2/2016 Debenham .......... B60R 21/0132 701/46
2016/0137152 A1* 5/2016 Park .................... B60R 21/0132 701/45
2016/0325702 A1* 11/2016 Nakamura .......... B60R 21/0134
2017/0232919 A1* 8/2017 Miyata ................ B60R 21/0136 701/45
2017/0341647 A1* 11/2017 Rajvanshi ............. B60W 30/12
2018/0111574 A1* 4/2018 Okamura ............ B60R 21/0132
2018/0208141 A1* 7/2018 Mase .................. B60R 21/0134
2018/0370471 A1* 12/2018 Bracalente .......... B60R 21/0132
2019/0016286 A1* 1/2019 Bartlett .................. G07C 5/085
2020/0148148 A1* 5/2020 Nakamura ........ B60R 21/23138
2021/0001795 A1* 1/2021 Andres ............... B60R 21/0132
2021/0009063 A1* 1/2021 Kim .................... B60R 21/0136
2022/0001821 A1* 1/2022 Yoshida .............. B60R 21/0136
2024/0051485 A1* 2/2024 Bartlett ............... B60R 21/0132

* cited by examiner

B
A
$Y_{VEH}$
24
12
20
26
$X_{VEH}$
26
22
10
V
V'
40
42
42'

$Y_{VEH}$
20
12
24
$X_{VEH}$
26
26
22
10
V
12
V'
40
42
42'

RR
X_VEH

150
SSS
SSS_X
SSS_Y
24
12
LBP_SIS
LBP_SIS_X
LBP_SIS_Y
LF
130
22
14
50
Y_VEH
RBP_SIS
RBP_SIS_X
RBP_SIS_Y
RT
12
140
16
100
10
ACU
ACU_X
ACU_Y
120
SAFETY
DEVICES
AIRBAGS
SEATBELTS
110
FW

ENHANCED DISCRIMINATION METHOD AND APPARATUS FOR CONTROLLING AN ACTUATABLE PROTECTION DEVICE

TECHNICAL FIELD

The present invention relates to a method and apparatus for controlling a vehicle actuatable occupant protection device and, in particular, to a method and apparatus for discriminating among several types of vehicle crash events. The enhanced discrimination method and apparatus provides the ability to identify and discriminate a side pole impact from a side moving deformable barrier impact. The enhanced discrimination method and apparatus also provides the ability to identify and discriminate a rear side pole impact from a front side pole or front barrier impact.

BACKGROUND

Actuatable vehicle occupant protection systems, or "vehicle safety systems," such as actuatable seatbelt and airbag systems, often include a plurality of event sensors, such as accelerometers, and an electronic control unit ("ECU") that monitors the sensors. The ECU makes a determination, based on the signals from the sensors, if the occupant restraining system should be actuated. In early actuatable restraining systems, mechanical sensor switches were used for deployment control. Later, other types of event sensors, such as accelerometers and pressure sensors, were developed and used.

For vehicle safety systems, it is desirable to discriminate amongst the various collision or impact events ("crash events") in which a vehicle can be involved. If the vehicle safety system can discriminate or identify the crash event as being of a particular type, the actuatable restraints can be actuated in a manner tailored to that particular type of crash event.

"Vehicle crash events," as used herein, is meant to encompass vehicle collisions or impacts with different types of structures. For example, a vehicle crash event, as used herein, can be meant to refer to a collision with a deformable barrier (e.g., another vehicle) or a non-deformable barrier, such as a tree or utility pole.

Vehicle safety systems can be configured or adapted to discriminate those crash events for which deployment of the actuatable occupant restraints is desired ("deployment crash events") from those crash events for which deployment of the actuatable occupant restraints is not desired ("non-deployment crash events"). Crash discrimination entails determining the type of crash event, e.g., deformable barrier, non-deformable barrier, front impact crash, rear impact crash, side impact crash, oblique crash, offset crash, etc. Crash discrimination also entails determining the severity of the crash. Crash discrimination further entails determining safing functions that act as checks or permissives to ensure that the protection devices are deployed in a safe manner.

From the above, it will be appreciated that it can be desirable to control the actuation and timing of the occupant protection devices in the safety system in response to the type and/or severity of the crash event in which the vehicle is involved. To determine which occupant protection devices to actuate in response to a sensed crash event, the safety system can implement a crash evaluation process to discriminate between types of crash events. If the identified crash event meets or exceeds a severity threshold, and the safing functions agree, the safety features of the vehicle can be actuated.

There are several types of crash events for which discrimination can be desired. Primary among these crash types are frontal impact and side impact crash events, each of which can be further classified as a more specific crash type. For example, frontal impact crash events can be further classified as full frontal crash events, offset frontal crash events, oblique/angular crash events, moving deformable barrier crash events, and small overlap crash events. As another example, side impact crash events can be classified as side moving deformable barrier crash events and side pole impact crash events. Side pole impact crash events can be further classified as front pole or rear pole side impact crash events, distinguishing a pole side impact to a front vehicle door ($1^{st}$ row) from a pole side impact to a rear door ($2^{nd}$ row, $3^{rd}$ row, etc.).

The National Highway Traffic Safety Administration ("NHTSA") is a U.S. government agency that governs vehicle safety and assesses new car safety via its New Car Assessment Program (US-NCAP). Through US-NCAP, NHTSA establishes crash tests to establish the crashworthiness of new vehicles and rates those vehicles with a star rating, with a five-star rating being the best. The standards for these tests are issued as Federal Motor Vehicle Safety Standards (FMVSS), which NHTSA issues to implement safety laws passed by Congress. The FMVSS standards describe in detail the precise test procedures used to determine the US-NCAP ratings, which are determined from metrics measured for crash test dummies positioned in the vehicle at the time of the test.

The U.S. is not the only country to have its own new car assessment program. Other countries, such as China, Japan, and Australia, and other groups of countries, such as Europe and Latin America, have their own NCAP. While the new car ratings issued by these bodies are similar, some utilize crash tests with slightly different methods.

Over the years, safety standards are modified and updated to "push the envelope" when it comes to automotive safety. As a result, in keeping up with the standards, automobile manufacturers are pushed to constantly improve the safety of their products. As the standards become more rigorous, the safety systems adapt and become more complex and capable. Through the evolution of vehicle safety systems, it has been discovered that crash classification is one of the key aspects that helps determine the efficacy of the system. If the safety system can accurately and robustly identify the crash scenario as defined by a safety standard, it can take measures tailored to produce the best results for occupants involved in accidents for which the standard is designed.

While vehicle safety systems have been developed with the ability to discriminate a variety of crash events, there exists a continuing need to further classify and discriminate amongst crash events so that the vehicle safety system can take the appropriate responsive action. Among the crash events for which discrimination can be desired are different types of side impact crash events, such as deformable barrier side impact crash events and pole side impact crash events, which can be defined by NCAP test procedures.

Deformable barrier side impact crash events are illustrated in FIGS. 1 and 2. In FIG. 1, a stationary vehicle 10 is impacted by a moving deformable barrier ("MDB") 30 moving at a prescribed velocity and direction, as indicated generally by arrow V. In FIG. 1, the direction V of the MDB 30 is parallel to the vehicle Y axis ($Y_{VEH}$) centered generally on a B-pillar 12 of the vehicle 10 and covering first row seating 20 and occupants 22, and second row seating 24 and occupants 26 in the vehicle.

In FIG. 2, the direction V of the MDB 30 is at an angle A with respect to the stationary vehicle 10. The face 32 of the barrier parallel to the vehicle X axis ($X_{VEH}$) and centered generally on the B-pillar 12.

For deformable barrier side impact crash tests, the configuration of the MDB 30 and the test procedures are determined by the issuing NCAP authority. For example, a Euro-NCAP crash test for moving deformable barrier crashworthiness can require a 1300 kg barrier moving at 50 km/h at a 90-degree angle into the driver side of the vehicle (see FIG. 1). This test can require a front row driver seated 50% male driver dummy (50th percentile male dummy is approximately 5'9" and weighs approximately 78 kg), and rear seated 10 year old (driver side seated) and 6 year old (passenger side seated) dummies, referred to as Q10 and Q6 dummies, respectively.

As another example, a US-NCAP crash test for moving deformable barrier crashworthiness can require a 1368 kg barrier moving at 55 km/h at a 90-degree angle into the driver side of the vehicle (see FIG. 1). This test can require a front row driver seated 50% male driver dummy, and a rear, driver side seated 5% female passenger (5th percentile female dummy is approximately 5'0" and weighs approximately 45 kg).

Similarly, another US-NCAP crash test for moving deformable barrier crashworthiness can require a 1368 kg barrier moving at 62 km/h at a 27-degree angle into the driver side of the vehicle (see FIG. 2; angle A=27 degrees). This test can also require a front row driver seated 50% male driver dummy, and a rear, driver side seated 5% female passenger.

As a further example, another safety rating agency, the Insurance Institute for Highway Safety (IIHS), governs an IIHS crash test for moving deformable barrier crashworthiness. This test can require a 1500 kg barrier moving at 50 km/h at a 90-degree angle into the driver side of the vehicle (see FIG. 1). This test can require both a front row driver and a rear, driver side passenger, both of which are 5% females.

Pole side impact crash events are illustrated in FIGS. 3 and 4. In FIG. 3, a vehicle 10 is moved at a prescribed velocity and direction, as indicated generally by arrow V, into a stationary rigid pole barrier 40. In FIG. 3, the direction V of the vehicle 10 is parallel to the vehicle Y axis ($Y_{VEH}$). For a first pole side impact crash event, the pole barrier 40 is positioned to center the pole 42 on the front row seating 20 and the occupant 22. This is indicated by the pole shown in solid lines at 42. Additionally or optionally, for a second pole side impact crash event, the pole barrier 40 can be positioned to center the pole on the second row seating 24 and the occupant 26. This is indicated by the pole shown in dashed lines at 42'.

In FIG. 4, the direction V of the vehicle 10 is angled with respect to the vehicle X and Y axes ($X_{VEH}$, $Y_{VEH}$), as indicated generally by angles A and B in FIG. 4. For a first pole side impact crash event, a front pole side impact crash event, the pole barrier 40 can be centered on the front row seating 20 and the occupant 22. This is indicated by the pole shown in solid lines at 42. Additionally or optionally, for a second pole side impact crash event, a rear pole side impact crash event, the pole barrier 40 can be centered on the second row seating 24 and the occupant 26. This is indicated by the pole shown in dashed lines at 42'. Rear pole side impact crash events, while tested for on the second row seating 24, can also be indicative of crash performance for seating in rows behind the second row, i.e., $3^{rd}$ row, $4^{th}$ row, etc.

For pole side impact crash tests, the configuration of the pole barrier 40 and the test procedures are determined by the issuing NCAP authority. For example, a US-NCAP crash test for angular pole side impact crashworthiness can require rigid pole and an impacting vehicle moving at an angle of 27 degrees with respect to the Y-axis ($Y_{VEH}$), i.e., angle B in FIG. 4 equals 27 degrees. The crash velocity can be 32 km/h. This Euro-NCAP angular pole side impact crash test can involve a 50% male occupant crash test dummy for the front row seated occupant 22.

As another example, a Euro-NCAP crash test for angular pole side impact crashworthiness can require a rigid pole and an impacting vehicle moving at an angle of 75 degrees with respect to the X-axis ($X_{VEH}$), i.e., angle A in FIG. 4 equals 75 degrees. The crash velocity can be 32 km/h. This Euro-NCAP angular pole side impact crash test can involve a 50% male occupant crash test dummy for the front row seated occupant 22.

As a further example, a Latin-NCAP crash test for angular pole side impact crashworthiness can require a rigid pole and an impacting vehicle moving at an angle of 90 degrees with respect to the X-axis ($X_{VEH}$), i.e., as shown in FIG. 3. The crash velocity can be 29 km/h. This Latin-NCAP angular pole side impact crash test can involve a 50% male occupant crash test dummy for the front row seated occupant 22.

From the above, it will be appreciated that side MDB and pole crash tests may differ slightly in terms of factors, such as the angle and velocity of the collision. The crash tests are similar or identical, however, in that the collisions or impacts occur at the same locations on the vehicle. Therefore, despite the differences in the crash test conditions, for any particular vehicle model, the tests should yield repeatable results in terms of occupant protection, within some reasonable margin.

Because of this, it follows that the various crash sensors used to detect the occurrence of these collisions should also produce repeatable crash signal indications within a similar margin. Accordingly, the control algorithms implemented by the safety system can be configured to determine or discriminate the type of collision based on the crash signals received from the sensors. In response to this determination, the safety system can determine if and how to respond.

Discrimination of a pole side impact crash event can be especially advantageous. Pole side impact crash events are slow developing, high intrusion events. By "high intrusion," it is meant that the rigid pole impacts a comparatively small surface area of the vehicle side structure, e.g., the side door, and moves very little in response to the crash event. As a result, the impacting vehicle absorbs the bulk of the crash forces, which are exerted on the comparatively small area covered by the pole. Because of this, the pole moves or "intrudes" a comparatively large distance into the side of the vehicle.

Because pole side impact crash events result in a comparatively large intrusion into the vehicle, it follows that the magnitudes of the accelerations that the vehicle undergoes as a result of these crash events are not as high as those associated with other crash events, such as those involving an MDB. Because of this, it can take longer for safety systems to detect pole side impact crash events than it does other (e.g., MDB) crash events. As a result, discriminating a pole side impact crash event can present challenges in meeting the required time-to-fire performance necessary to provide ideal occupant protection. The required time-to-fire, or "RTTF," refers to the timeframe within which safety devices, e.g., airbag inflators, must be actuated in order to afford the desired occupant protection.

Because of the close proximity of occupants to the vehicle side structure, the RTTF for side impact protection devices, such as curtain airbags, is typically low. Due to this, and in view of the aforementioned considerations, it can be advantageous to discriminate pole side impact crash events from other crash events, such as side MDB crash events. It can also be advantageous to discriminate a front pole side impact crash event from a rear pole side impact crash event.

SUMMARY

According to one aspect, a method for controlling an actuatable safety device for helping to protect a vehicle occupant includes sensing a plurality of vehicle acceleration parameters. The method also includes executing one or more metrics that evaluate the acceleration parameters to determine whether vehicle crash thresholds are exceeded and producing crash event indications in response thereto. The method also includes evaluating the crash event indications to identify a pole side impact, and controlling deployment of the actuatable safety device in response to identifying the pole side impact crash event.

According to another aspect, identifying the pole side impact crash event can include discriminating the pole side impact crash event from a barrier side impact crash event.

According to another aspect, alone or in combination with any other aspect, discriminating the pole side impact crash event from the barrier side impact crash event can include: measuring via a satellite safety sensor (SSS) a vehicle X-axis acceleration (SSS_X) and a vehicle Y-axis acceleration (SSS_Y); determining from SSS_X a vehicle X-axis relative velocity (SSS_X_Rel_Vel); determining from SSS_Y a vehicle Y-axis relative velocity (SSS_Y_Rel_Vel); and comparing SSS_X_Rel_Vel to SSS_Y_Rel_Vel to classify a side impact crash event as a pole side impact crash event or a barrier side impact crash event.

According to another aspect, alone or in combination with any other aspect, comparing SSS_X_Rel_Vel to SSS_Y_Rel_Vel to classify a side impact crash event as a pole side impact crash event or a barrier side impact crash event can include: classifying the side impact crash event as a barrier side impact crash event in response to determining a comparatively high SSS_Y_Rel_Vel in relation to the SSS_X_Rel_Vel; and classifying the side impact crash event as a pole side impact crash event in response to determining a comparatively low SSS_Y_Rel_Vel in relation to the SSS_X_Rel_Vel.

According to another aspect, alone or in combination with any other aspect, discriminating the pole side impact crash event from the barrier side impact crash event can include: measuring via an airbag control unit (ACU) a vehicle X-axis acceleration (ACU_X) and a vehicle Y-axis acceleration (ACU_Y); determining from ACU_X a vehicle X-axis relative velocity (ACU_X_Rel_Vel); determining from ACU_Y a vehicle Y-axis relative velocity (ACU_Y_Rel_Vel); and comparing ACU_X_Rel_Vel to ACU_Y_Rel_Vel to discriminate the pole side impact crash event from the barrier side impact crash event.

According to another aspect, alone or in combination with any other aspect, comparing ACU_X_Rel_Vel to ACU_Y_Rel_Vel to classify a side impact crash event as a pole side impact crash event or a barrier side impact crash event can include: classifying the side impact crash event as a barrier side impact crash event in response to determining a comparatively high ACU_Y_Rel_Vel in relation to the ACU_X_Rel_Vel; and classifying the side impact crash event as a pole side impact crash event in response to determining a comparatively low ACU_Y_Rel_Vel in relation to the ACU_X_Rel_Vel.

According to another aspect, alone or in combination with any other aspect, discriminating the pole side impact crash event from the barrier side impact crash event can include discriminating the pole crash event from the barrier side impact crash event on an impact side of the vehicle by: measuring via an impact side sensor (LBP_SIS) an impact side X-axis acceleration (LBP_SIS_X) and an impact side Y-axis acceleration (LBP_SIS_Y); determining from LBP_SIS_X an impact side X-axis relative displacement (LBP_X_Rel_Displ); determining from LBP_SIS_Y an impact side Y-axis relative velocity (LBP_Y_Rel_Vel); and comparing LBP_X_Rel_Displ to LBP_Y_Rel_Vel to classify a side impact crash event as a pole side impact crash event or a barrier side impact crash event on the impact side of the vehicle.

According to another aspect, alone or in combination with any other aspect, comparing LBP_X_Rel_Displ to LBP_Y_Rel_Vel to classify a side impact crash event as a pole side impact crash event or a barrier side impact crash event on the impact side of the vehicle can include: classifying the side impact crash event as a barrier side impact crash event in response to determining that the compared LBP_X_Rel_Displ to LBP_Y_Rel_Vel exceeds a normal threshold; and classifying the side impact crash event as a pole side impact crash event in response to determining that the compared LBP_X_Rel_Displ to LBP_Y_Rel_Vel exceeds a pole threshold.

According to another aspect, alone or in combination with any other aspect, comparing LBP_X_Rel_Displ to LBP_Y_Rel_Vel to classify a side impact crash event as a pole side impact crash event or a barrier side impact crash event can further comprise determining whether a safing function for a non-impact side of the vehicle permits the classification.

According to another aspect, alone or in combination with any other aspect, discriminating the pole side impact crash event from the barrier side impact crash event can include discriminating the pole crash event from the barrier side impact crash event on an impact side of the vehicle by: measuring via an non-impact side sensor (RBP_SIS) an non-impact side X-axis acceleration (RBP_SIS_X) and an non-impact side Y-axis acceleration (RBP_SIS_Y); determining from RBP_SIS_X a non-impact side X-axis relative displacement (RBP_X_Rel_Displ); determining from RBP_SIS_Y a non-impact side Y-axis relative velocity (RBP_Y_Rel_Vel); and comparing RBP_X_Rel_Displ to RBP_Y_Rel_Vel to classify a side impact crash event as a pole side impact crash event or a barrier side impact crash event on the impact side of the vehicle.

According to another aspect, alone or in combination with any other aspect, comparing RBP_X_Rel_Displ to RBP_Y_Rel_Vel to classify a side impact crash event as a pole side impact crash event or a barrier side impact crash event on the impact side of the vehicle can include: classifying the side impact crash event as a barrier side impact crash event in response to determining that the compared RBP_X_Rel_Displ to RBP_Y_Rel_Vel exceeds a normal threshold; and classifying the side impact crash event as a pole side impact crash event in response to determining that the compared RBP_X_Rel_Displ to RBP_Y_Rel_Vel exceeds a pole threshold.

According to another aspect, alone or in combination with any other aspect, comparing RBP_X_Rel_Displ to RBP_Y_Rel_Vel to classify a side impact crash event as a pole side impact crash event or a barrier side impact crash event further can include determining whether a safing function for an impact side of the vehicle permits the classification.

According to another aspect, alone or in combination with any other aspect, identifying the pole side impact crash event can include discriminating a rear pole side impact crash event from a front side impact crash event.

According to another aspect, alone or in combination with any other aspect, discriminating the rear pole side impact crash event from a front side pole or front barrier impact crash event and from a barrier side impact crash event can include: measuring via a satellite safety sensor (SSS) a vehicle Y-axis acceleration (SSS_Y); measuring via an airbag ECU (ACU) a vehicle Y-axis acceleration (ACU_Y); determining from SSS_Y a vehicle Y-axis relative velocity (SSS_Y_Rel_Vel); determining from ACU_Y a vehicle Y-axis relative velocity (ACU_Y_Rel_Vel); and comparing SSS_Y_Rel_Vel to ACU_Y_Rel_Vel to classify a side impact crash event as rear pole side impact crash or a front side impact crash event.

According to another aspect, alone or in combination with any other aspect, comparing SSS_Y_Rel_Vel to ACU_Y_Rel_Vel to classify a side impact crash event as rear pole side impact crash or a front side impact crash event can include: classifying the side impact crash event as a rear pole side impact crash event in response to determining a comparatively high SSS_Y_Rel_Vel in relation to the ACU_Y_Rel_Vel; and classifying the side impact crash event as a front pole side impact crash event in response to determining a comparatively low SSS_Y_Rel_Vel in relation to the ACU_Y_Rel_Vel.

According to another aspect, alone or in combination with any other aspect, a vehicle safety system can include one or more vehicle safety devices; and a controller configured to execute the method for controlling an actuatable safety device according to any of the aforementioned aspects to actuate the one or more vehicle safety devices.

According to another aspect, alone or in combination with any other aspect, the vehicle safety system can include: a left B-pillar side impact sensor (LBP_SIS) configured to be mounted on a left B-pillar of the vehicle; a right B-pillar side impact sensor (RBP_SIS) configured to be mounted on a right B-pillar of the vehicle; a satellite safety sensor (SSS) configured to be mounted in a roof of the vehicle along a vehicle Y-axis above rear row seating in the vehicle; and an airbag control unit (ACU) configured to be mounted in an instrument panel of the vehicle along the vehicle Y-axis, wherein the controller is implemented in the ACU and wherein the LBP_SIS, RBP_SIS, and SSS are configured to communicate with the ACU.

According to another aspect, alone or in combination with any other aspect, the one or more vehicle safety devices can include at least one of a side airbag and a curtain airbag.

DRAWINGS

The foregoing and other features and advantages of the invention will become apparent to one skilled in the art upon consideration of the following description of the invention and the accompanying drawings in which.

DESCRIPTION

Figure 5:
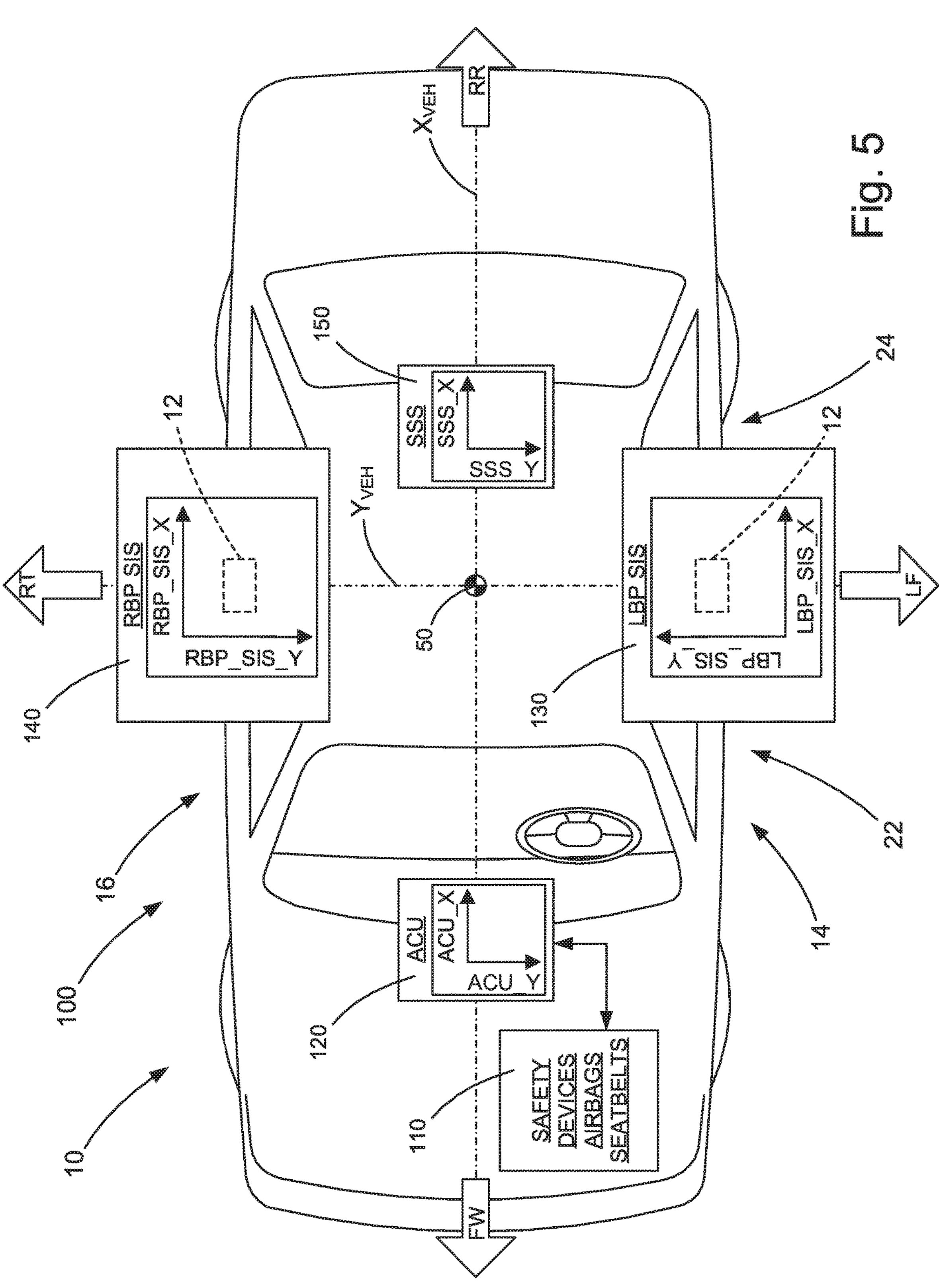
FIG. 5 is a schematic diagram illustrating vehicle safety system, according to another aspect of the invention.

Referring to FIG. 5, a vehicle 10 includes a vehicle safety system 100. The safety system 100 can include a plurality of actuatable vehicle safety devices, which are shown schematically at 110. The actuatable safety devices 110 can, for example, include airbags (e.g., frontal airbags, side impact airbags, curtain airbags, etc.) and seatbelts.

The system 100 further includes a plurality of vehicle-based sensors operatively connected to an airbag control unit ("ACU") 120. The ACU 120 is typically mounted in the instrument panel of the vehicle 10. The protection devices 110 also are operatively connected to the ACU 120. The vehicle-based sensors are used for sensing vehicle conditions and crash indications. The vehicle-based sensors include an ACU sensor 122, which includes of a two-axis accelerometer for measuring vehicle accelerations in the direction of the X-axis ($X_{VEH}$) and the Y-axis ($Y_{VEH}$). The ACU sensor 122 determines values indicative of these sensed vehicle accelerations. ACU_X is a value indicative of vehicle acceleration measured in the direction of the vehicle X-axis ($X_{VEH}$) at the location of the ACU 120. ACU_Y is a value indicative of vehicle acceleration measured in the direction of the vehicle Y-axis ($Y_{VEH}$) at the location of the ACU 120.

The vehicle-based sensors also include a left B-pillar side impact sensor 130, referred to herein as the LBP_SIS. The LBP_SIS 130 is mounted to the vehicle side structure at or near the B-pillar 12 on the left or driver side 14 of the vehicle 10. The LBP_SIS 130 includes a two-axis accelerometer for measuring vehicle accelerations in the direction of the X-axis ($X_{VEH}$) and the Y-axis ($Y_{VEH}$). The LBP_SIS 130 determines values indicative of these sensed vehicle accelerations. LBP_SIS_X is a value indicative of vehicle acceleration measured in the direction of the vehicle X-axis ($X_{VEH}$) at the location of the LBP_SIS 130. LBP_SIS_Y is a value indicative of vehicle acceleration measured in the direction of the vehicle Y-axis ($Y_{VEH}$) at the location of the LBP_SIS 130.

The vehicle-based sensors also include a right B-pillar side impact sensor 140, referred to herein as the RBP_SIS. The RBP_SIS 140 is mounted to the vehicle side structure at or near the B-pillar 12 on the right or passenger side 16 of the vehicle 10. The RBP_SIS 140 includes a two-axis accelerometer for measuring vehicle accelerations in the direction of the X-axis ($X_{VEH}$) and the Y-axis ($Y_{VEH}$). The RBP_SIS 140 determines values indicative of these sensed vehicle accelerations. RBP_SIS_X is a value indicative of vehicle acceleration measured in the direction of the vehicle X-axis ($X_{VEH}$) at the location of the RBP_SIS 140. RBP_SIS_Y is a value indicative of vehicle acceleration measured in the direction of the vehicle Y-axis ($Y_{VEH}$) at the location of the RBP_SIS 140.

The vehicle-based sensors also include a satellite safety sensor 150, referred to herein as the SSS. The SSS 150 is mounted to the vehicle roof 18 and is centered over the second row seats 24. In a vehicle with greater than two rows of seats, the SSS 150 can be mounted over the any of the rear row seats, such as over the second row seats or third row seats. The SSS 150 includes a two-axis accelerometer for measuring vehicle accelerations in the direction of the X-axis ($X_{VEH}$) and the Y-axis ($Y_{VEH}$). The SSS 150 determines values indicative of these sensed vehicle accelerations. SSS_X is a value indicative of vehicle acceleration measured in the direction of the vehicle X-axis ($X_{VEH}$) at the location of the SSS 150. SSS_Y is a value indicative of vehicle acceleration measured in the direction of the vehicle Y-axis ($Y_{VEH}$) at the location of the SSS 150.

The ACU 120, LBP_SIS 130, RBP_SIS 140, and SSS 150 measure their respective accelerations, values of which are provided to the ACU 120. The ACU 120 uses the measured acceleration values to calculate, via integration, measured velocities (first integral) and displacements (second or double integral). Through this, the ACU 120 can make the values shown below in Table 1 available for use in control algorithms implemented by the ACU:

TABLE 1

| Sensor | Acceleration | Velocity | Displacement |
|---|---|---|---|
| ACU | ACU_X_AMA | ACU_X_Rel_Vel | ACU_X_Rel_Displ |
| | ACU_Y_AMA | ACU_Y_Rel_Vel | ACU_Y_Rel_Displ |
| SSS | SSS_X_AMA | SSS_X_Rel_Vel | SSS_X_Rel_Displ |
| | SSS_Y_AMA | SSS_Y_Rel_Vel | SSS_Y_Rel_Displ |
| LBP_SIS | LBP_X_AMA | LBP_X_Rel_Vel | LBP_X_Rel_Displ |
| | LBP_Y_AMA | LBP_Y_Rel_Vel | LBP_Y_Rel_Displ |
| RBP_SIS | RBP_X_AMA | RBP_X_Rel_Vel | RBP_X_Rel_Displ |
| | RBP_Y_AMA | RBP_Y_Rel_Vel | RBP_Y_Rel_Displ |

The values listed in Table 1 are signed values, i.e., positive (+) and negative (−), based on the directions sensed by the respective two axis accelerometers. For the ACU 120, acceleration, velocity, and displacement in the X direction are positive (+) in response to forward movement (see arrow FW in FIG. 5) and negative (−) in response to rearward movement (arrow RR). Additionally, for the ACU 120, acceleration, velocity, and displacement in the Y direction are positive (+) in response to rightward movement (see arrow RT in FIG. 5) and negative (−) in response to leftward movement (arrow LF).

For the SSS 150, acceleration, velocity, and displacement in the X direction are positive (+) in response to forward movement (arrow FW) and negative (−) in response to rearward movement (arrow RR). Additionally, for the SSS 150, acceleration, velocity, and displacement in the Y direction are positive (+) in response to rightward movement (arrow RT) and negative (−) in response to leftward movement (arrow LF).

For the LBP_SIS 130 and RBP_SIS 140, acceleration, velocity, and displacement in the X direction are positive (+) in response to forward movement (arrow FW) and negative (−) in response to rearward movement (arrow RR). For the LBP_SIS 130 and RBP_SIS 140, acceleration, velocity, and displacement in the Y direction are positive (+) in response to movement toward the vehicle center 50 and negative (−) in response to movement away from the vehicle center. Thus, for the LBP_SIS 130, acceleration, velocity, and displacement in the Y direction are positive (+) in response to rightward movement (arrow RT) and negative (−) in response to leftward movement (arrow LF). For the RBP_SIS 140, acceleration, velocity, and displacement in the Y direction are positive (+) in response to leftward movement (arrow LF) and negative (−) in response to rightward movement (arrow RT).

FIGS. 6-10 illustrate algorithms or portions of an algorithm that can be implemented by the vehicle safety system 10 to discriminate between a front and rear side pole impact. The algorithm(s) can, for example, be implemented in the ACU 120. The ACU 120 can actuate the safety devices 110 in response to the discrimination determinations made via the algorithm(s).

In this description, each of FIGS. 6-10 can be described as an algorithm itself, the products of which are utilized by algorithms of other figures to make the final front/rear side pole impact determination. Alternatively, each of FIGS. 6-10 can be considered portions of an algorithm implemented by the vehicle safety system 100. Regardless of the characterization, the algorithm(s) illustrated in FIGS. 6-10 are operative to detect the occurrence of a side pole impact and to discriminate between a front and rear side pole impact on an impact side of the vehicle.

The algorithm(s) of FIGS. 6-10 discriminates a side impact on an impact side of the vehicle using metrics from both the impact and non-impact sides of the vehicle. In the example configuration of FIGS. 6-10, the impact side is the left/driver side 14 of the vehicle and the non-impact side is the right/passenger side 16 of the vehicle. Therefore, the algorithm of FIGS. 6-10 it will be appreciated that this description describes how the algorithm(s) determine a left/driver side pole impact and discriminate between a front and rear left/driver side pole impact. Those skilled in the art will appreciate that the algorithm(s) of FIGS. 6-10 can determine a right/passenger side pole impact and discriminate between a front and rear right/passenger side pole impact in a manner that is identical to the left/driver side description, with references to the side of the vehicle (i.e., left/right, driver/passenger) being flipped or swapped.

In FIGS. 6-10, certain metrics are illustrated graphically to illustrate how the algorithms implemented by the vehicle safety system 10 make determinations based on the values listed in Table 1. By graphically, it is meant that the determinations are illustrated in graphs or charts in which certain ones of the values from Table 1 are plotted. Crash conditions are identified, classified, and discriminated based on whether the plots reach predetermined threshold values or fall within a certain region or range. The outputs of these metrics are Boolean outputs, i.e., zero/one, yes/no, on/off, which are fed to Boolean logic that implements logical operators, i.e., AND, OR, NOT, etc. to make the crash identification, classification, and discrimination determinations. It should be understood that, implementing the algorithms can entail mathematical operations as opposed to graphical representations, such as ones that refer to look-up tables, in order to evaluate the measured values and make their respective identifications, classifications, and discriminations.

Side Impact Discrimination Algorithm

Figure 6:
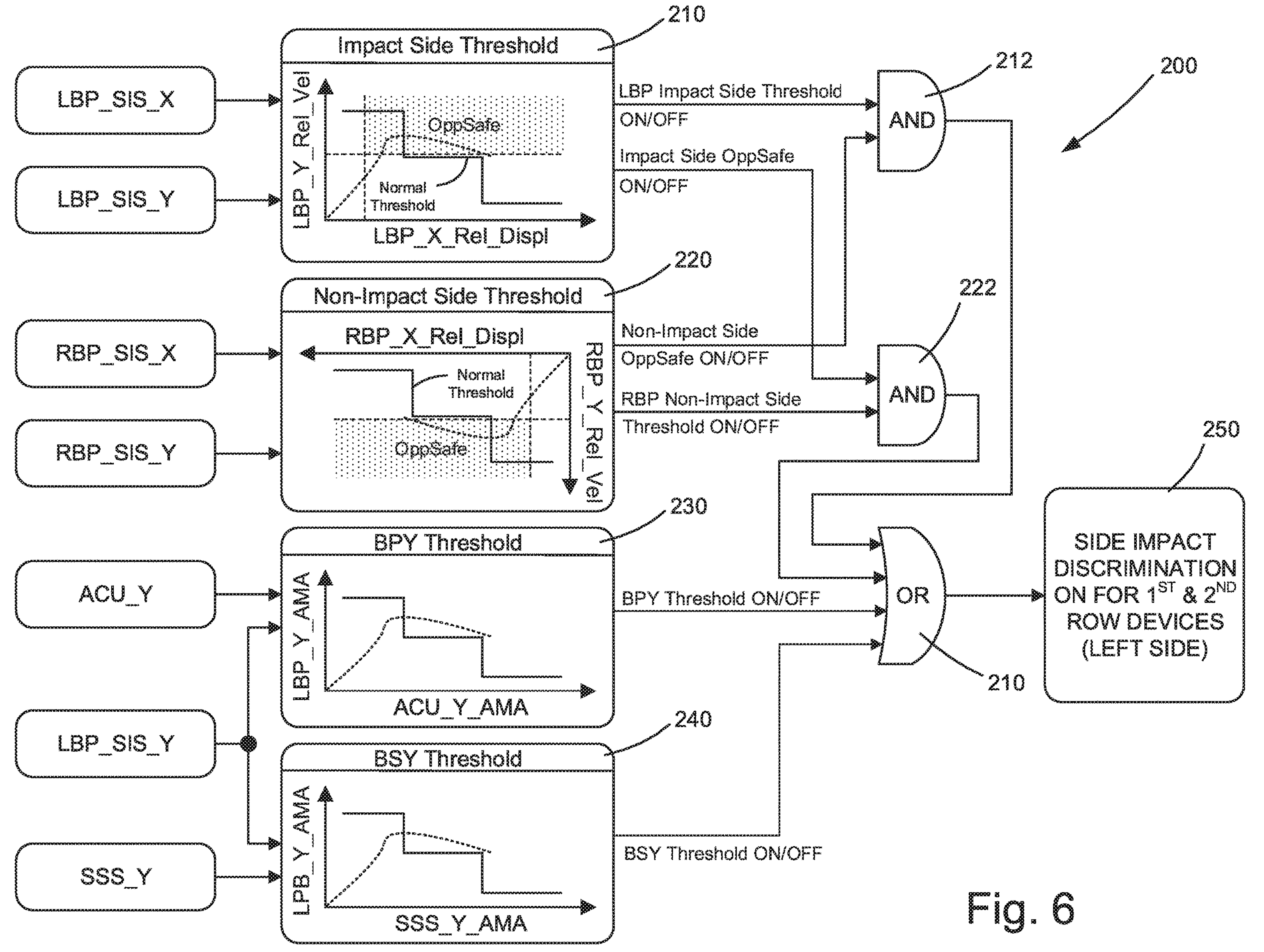
FIG. 6 is a schematic block diagram depicting a side impact discrimination algorithm implemented by the vehicle safety system.

FIG. 6 illustrates a side impact discrimination algorithm 200 implemented by the vehicle safety system 100. The side impact discrimination algorithm 200 can, for example, be implemented in the ACU 120. The side impact discrimination algorithm 200 of FIG. 6 discriminates a side impact on the left/driver side 14 of the vehicle 10. The side impact discrimination algorithm 200 can also discriminate a side impact on the right/passenger side 16 of the vehicle 10, as described above.

The side impact discrimination algorithm 200 determines a left side impact discrimination, shown at 250, for first and second row occupants based on four metrics, as shown at OR gate 242. Those metrics include determinations made by an impact side threshold metric 210, a non-impact side threshold metric 220, a BPY threshold metric 230, and a BSY threshold metric 240.

Impact Side Threshold Metric

The impact side threshold metric 210 compares the left B-pillar Y-axis relative velocity (LBP_Y_Rel_Vel) to the left B-pillar X-axis relative displacement (LBP_X_Rel_Displ), based on the left B-pillar X and Y axis accelerations LBP_SIS_X, LBP_SIS_Y measured by the impact side (i.e., left/driver side) B-pillar acceleration sensor LBP_SIS 130.

The impact side threshold metric 210 has a stepped solid line that represents an impact side threshold for the compared signals. If the metric comparing LBP_Y_Rel_Vel to LBP_X_Rel_Displ exceeds the impact side threshold at any time during a sensed event, the LBP impact side normal threshold is ON. Otherwise, the LBP impact side normal threshold is OFF.

The impact side threshold metric 210 also includes a safing region identified as OppSafe, which represents a safing function for side impacts on the opposite side of the vehicle. If the metric comparing RBP_Y_Rel_Vel to RBP_X_Rel_Displ enters the OppSafe region at any time during a sensed event, the LBP impact side OppSafe is ON. Otherwise, the LBP impact side OppSafe is OFF.

By way of example in FIG. 6, the impact side threshold metric 210 includes a dashed line that represents an example metric comparing LBP_Y_Rel_Vel to LBP_X_Rel_Displ. As shown, this example metric exceeds the impact side threshold and also enters the OppSafe region. Therefore, for this example metric, the LBP impact side normal threshold is ON and the LBP impact side OppSafe is ON.

Nojn-Impact Side Threshold Metric

The non-impact side threshold metric 220 compares the right B-pillar Y-axis relative velocity (RBP_Y_Rel_Vel) to the right B-pillar X-axis relative displacement (RBP_X_Rel_Displ), based on the right B-pillar X and Y axis accelerations RBP_SIS_X, RBP_SIS_Y measured by the non-impact side (i.e., right/passenger side) B-pillar acceleration sensor RBP_SIS 140.

The non-impact side threshold metric 220 has a stepped solid line that represents an non-impact side threshold for the compared signals. If the metric comparing RBP_Y_Rel_Vel to RBP_X_Rel_Displ exceeds the non-impact side threshold at any time during a sensed event, the RBP non-impact side normal threshold is ON. Otherwise, the RBP non-impact side normal threshold is OFF.

The non-impact side threshold metric 220 also includes a safing region identified as OppSafe, which represents a safing function for side impacts on the opposite side of the vehicle. If the metric comparing LBP_Y_Rel_Vel to LBP_X_Rel_Displ enters the OppSafe region at any time during a sensed event, the RBP non-impact side OppSafe is ON. Otherwise, the RBP non-impact side OppSafe is OFF.

By way of example in FIG. 6, the non-impact side threshold metric 220 includes a dashed line that represents an example metric comparing RBP_Y_Rel_Vel to RBP_X_Rel_Displ. As shown, this example metric exceeds the non-impact side threshold and also enters the OppSafe region. Therefore, for this example metric, the RBP non-impact side normal threshold is ON and the RBP non-impact side OppSafe is ON.

BPY Threshold Metric

The BPY threshold metric 230 compares the left B-pillar Y-axis acceleration (LBP_Y_AMA) to the ACU_Y-axis acceleration (ACU_Y_AMA). LBP_Y_AMA is based on the left B-pillar Y-axis acceleration (LBP_SIS_Y) measured by the left/driver side B-pillar acceleration sensor LBP_SIS 130. ACU_Y_AMA is based on the ACU Y-axis acceleration (ACU_Y) measured by the ACU 120.

The BPY threshold metric 230 has a stepped solid line that represents the BPY threshold for the compared signals. If the metric comparing LBP_Y_AMA to ACU_Y_AMA exceeds the BPY threshold at any time during a sensed event, the BPY threshold is ON. Otherwise, the BPY threshold is OFF.

By way of example in FIG. 6, the BPY threshold metric 230 includes a dashed line that represents an example metric comparing LBP_Y_AMA to ACU_Y_AMA. As shown, this example metric exceeds the BPY threshold. Therefore, for this example metric, the BPY threshold is ON.

BSY Impact Side Threshold Metric

The BSY threshold metric 240 compares the left B-pillar Y-axis acceleration (LBP_Y_AMA) to the SSS Y-axis acceleration (SSS_Y_AMA). LBP_Y_AMA is based on the left B-pillar Y-axis acceleration (LBP_SIS_Y) measured by the left/driver side B-pillar acceleration sensor LBP_SIS 130. SSS_Y_AMA is based on the SSS Y-axis acceleration (SSS_Y) measured by the SSS 150.

The BSY threshold metric 240 has a stepped solid line that represents the BSY threshold for the compared signals. If the metric comparing LBP_Y_AMA to SSS_Y_AMA exceeds the BSY threshold at any time during a sensed event, the BSY threshold is ON. Otherwise, the BSY threshold is OFF.

By way of example in FIG. 6, the BSY threshold metric 240 includes a dashed line that represents an example metric comparing LBP_Y_AMA to SSS_Y_AMA. As shown, this example metric exceeds the BSY threshold. Therefore, for this example metric, the BSY threshold is ON.

As shown in FIG. 6, the left side impact discrimination 250 is ON for first and second row occupants if any of the following conditions determined at OR gate 242 is satisfied, i.e., ON:

BPY threshold ON.

BSY threshold ON.

LBP impact side threshold ON and RBP OppSafe ON (AND gate 212).

RBP non-impact side threshold ON and LBP OppSafe ON (AND gate 222).

The impact side threshold metric 210 and the non-impact side threshold metric 220 of FIG. 6 are implemented in addition to the BPY threshold metric 230 and BSY threshold metric 240, which are considered more conventional side impact determination metrics. The addition of the impact side threshold metric 210 and the non-impact side threshold metric 220 improve the performance of the side pole crash event classification. This is because LBP_SIS_Y relative to LBP_SIS_X for a pole side impact has a higher magnitude than for a barrier side impact.

Implementing the impact side threshold metric 210 and non-impact side threshold metric 220 improves the side impact detection algorithm 200 by utilizing B-pillar measured accelerations only, which places all of the measurement directly at the crash zone. This also, however, creates the need for the OppSafe functions of the metrics in order to account for inadvertent firing in a misuse event. The OppSafe functions would, for example, prevent firing in a misuse event where the B-pillar is struck by a hammer, referred to sometimes as a hammer blow test.

ACU and SSS Pole/Barrier Classification Algorithm

Figure 1:
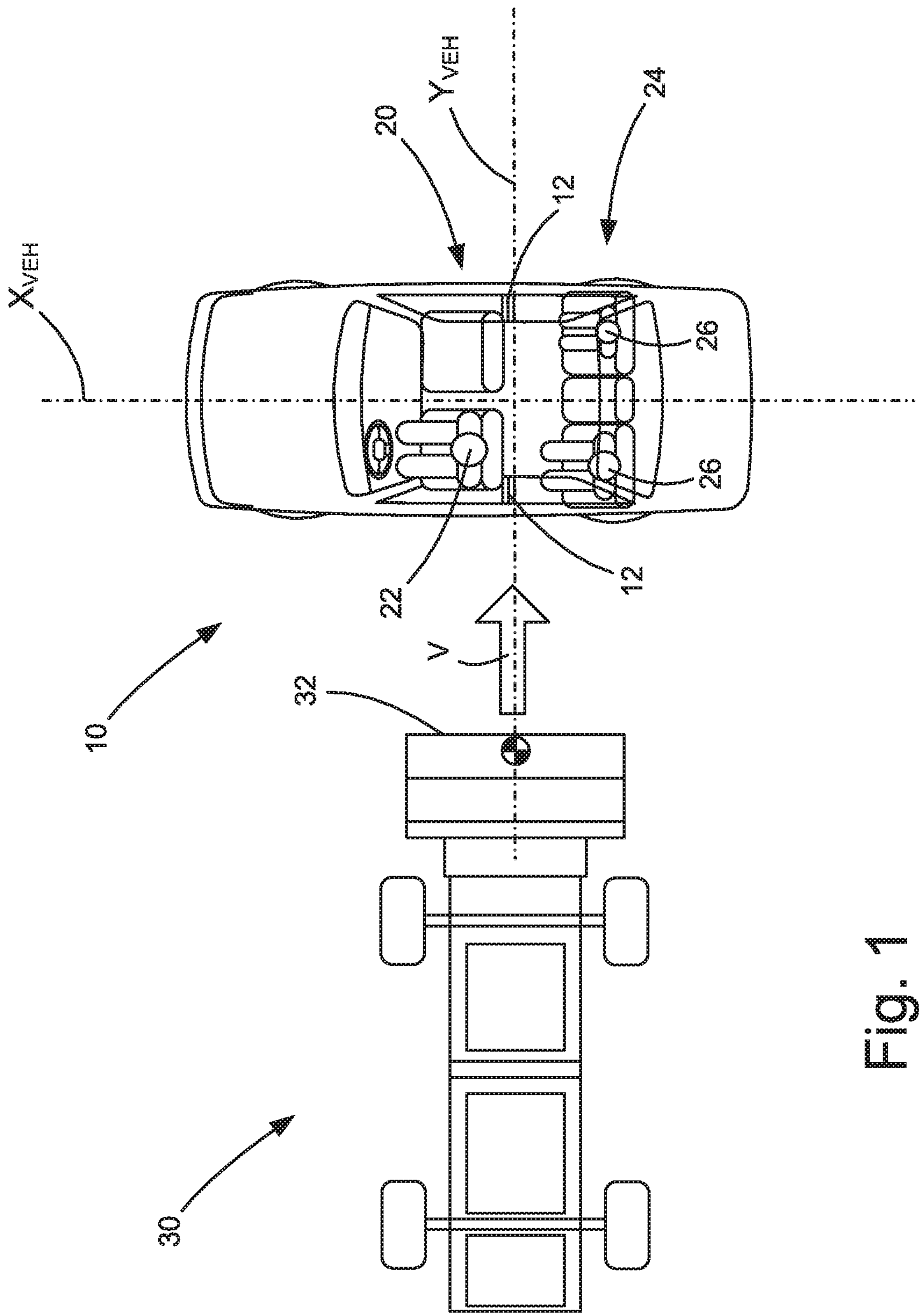
FIGS. 1 and 2 are schematic diagrams illustrating moving deformable barrier side impact crash test procedures, according to one aspect of the invention.
Figure 2:
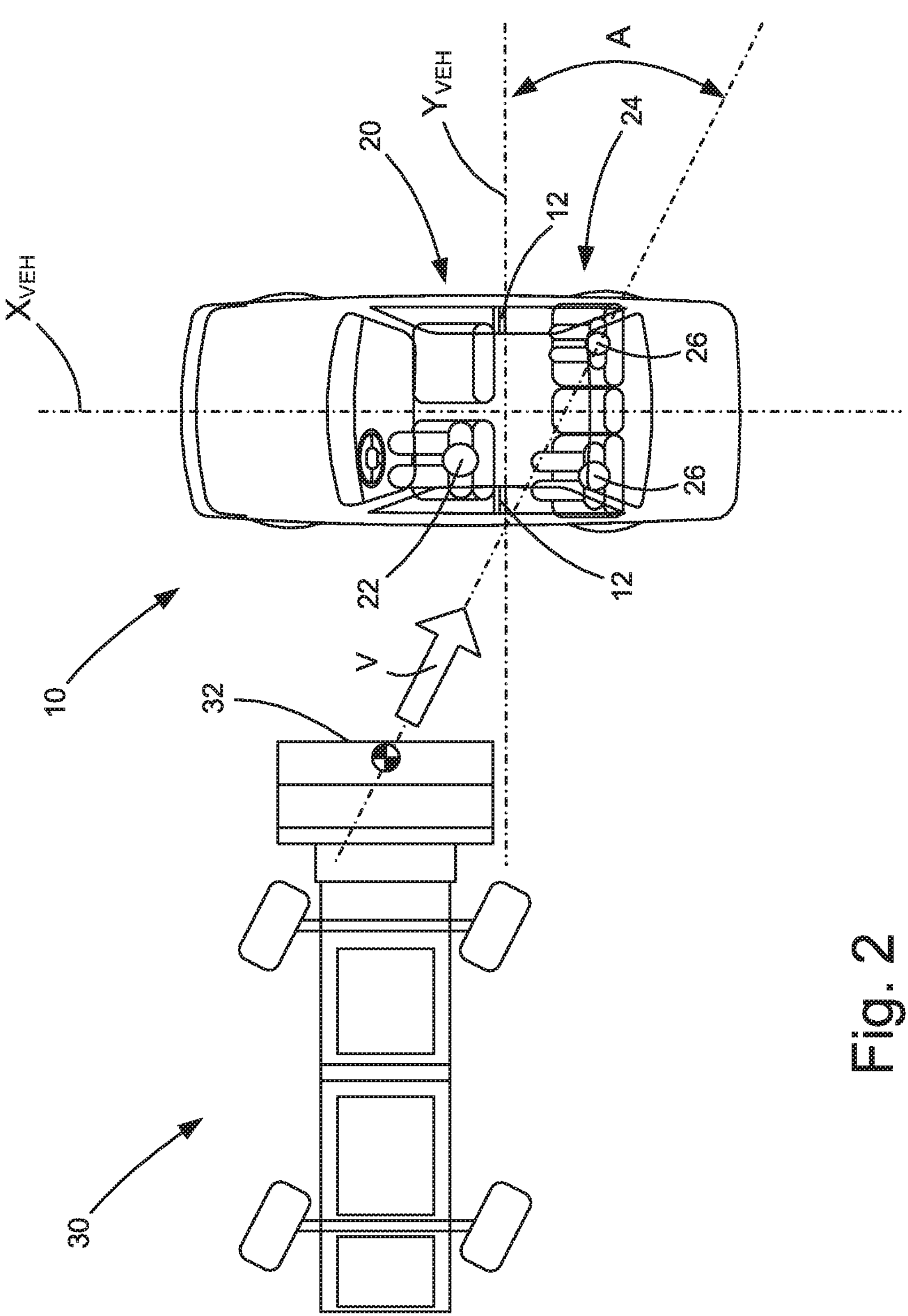
Figures 3, 4:
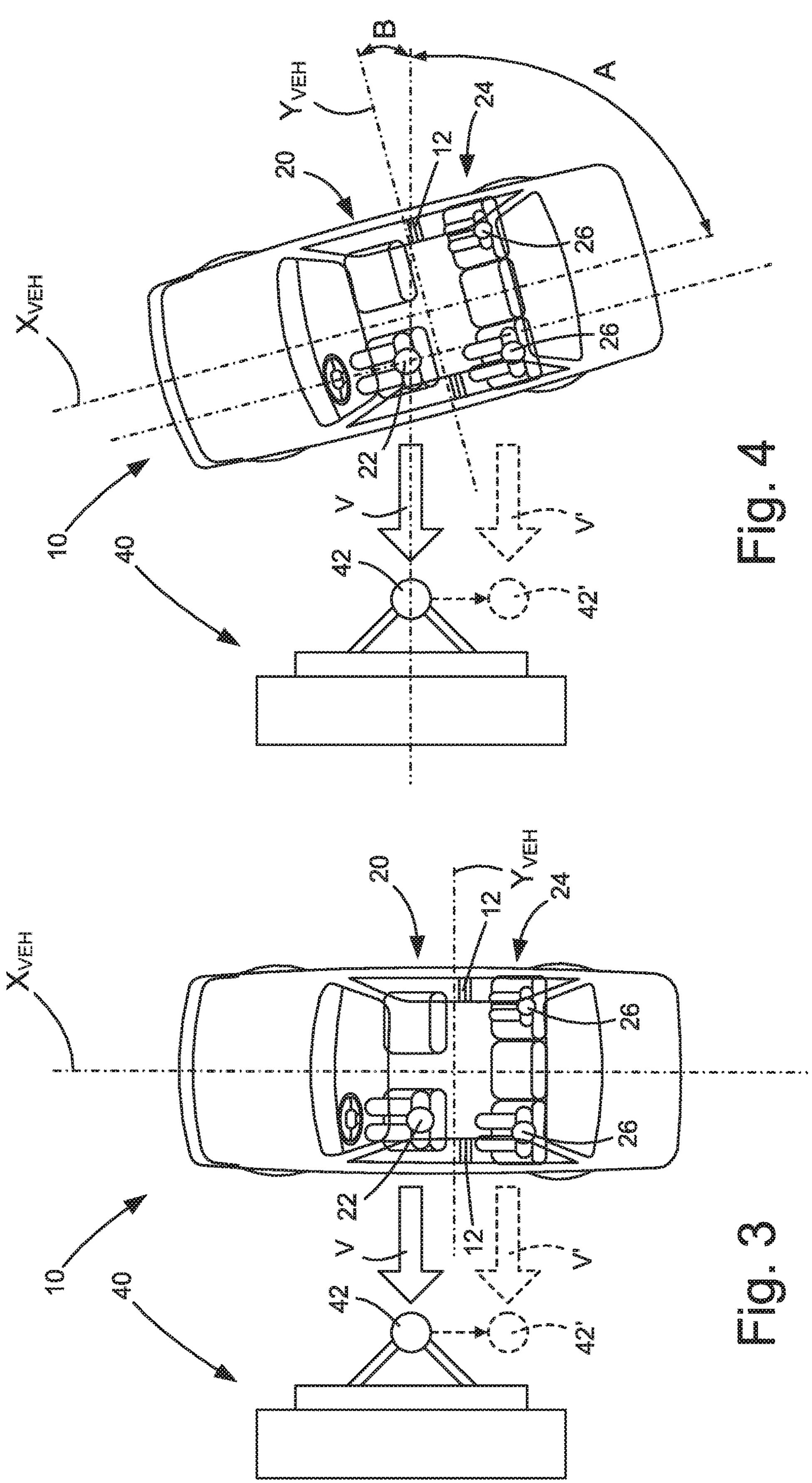
FIGS. 3 and 4 are schematic diagrams illustrating pole side impact crash test procedures, according to another aspect of the invention.
Figure 7:
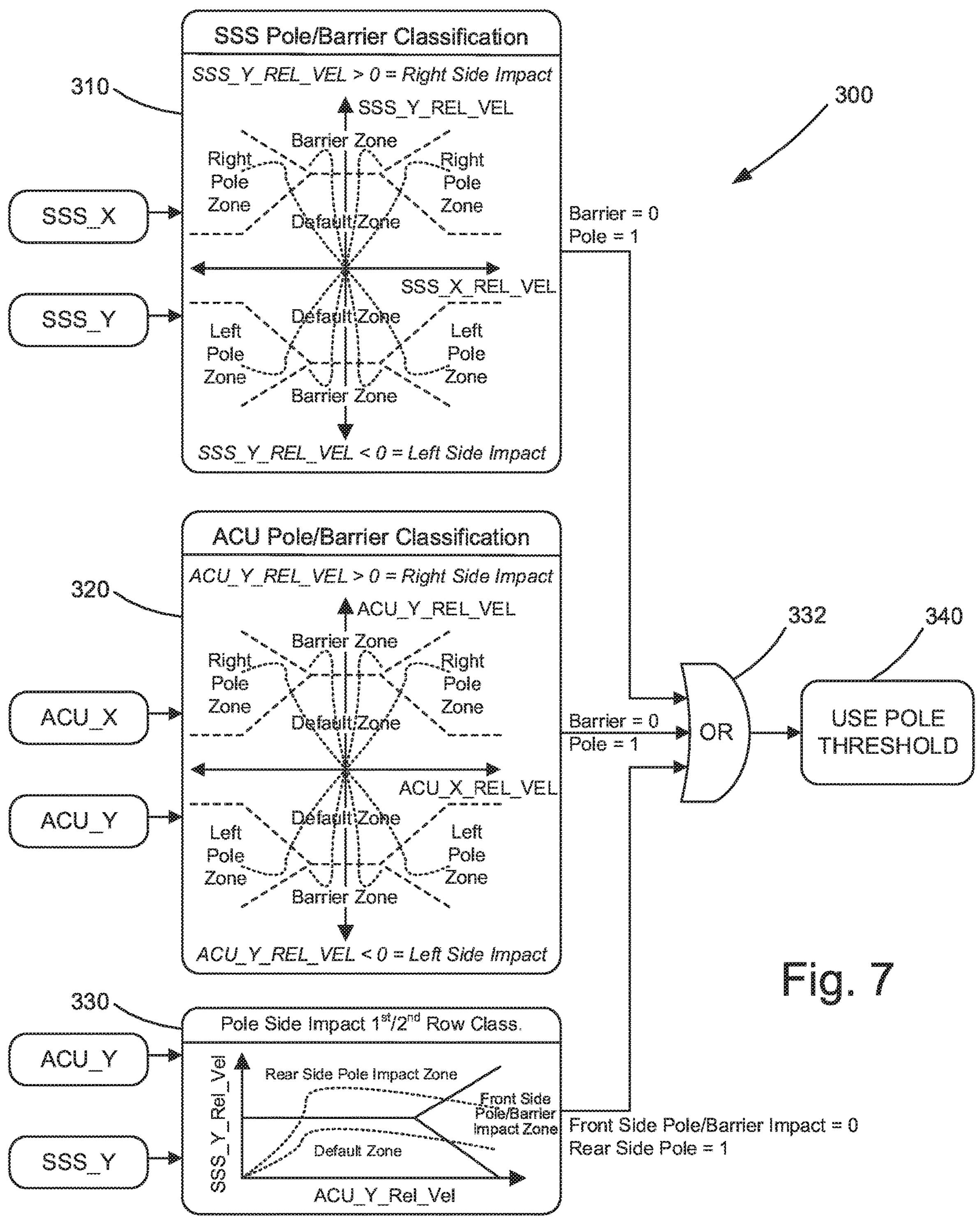
FIG. 7 is a schematic block diagram depicting a pole/barrier classification algorithm implemented by the vehicle safety system.

FIG. 7 illustrates a pole/barrier classification algorithm 300 utilizing the ACU 120 and SSS 150 that is implemented by the vehicle safety system 100. The pole/barrier classification algorithm 300 can, for example, be implemented in the ACU 120. The pole/barrier classification algorithm 300 classifies a side impact to the vehicle as being a barrier impact (see, e.g., FIG. 1 or 2) or a pole impact (see, e.g., FIG. 1 or 2).

In the example of FIG. 7, the pole/barrier classification algorithm 300 of FIG. 7 utilizes accelerations measured by the ACU 120 and the SSS 150, both of which are mounted centrally, i.e., on the vehicle X-axis ($X_{VEH}$). Therefore, the pole/barrier classification algorithm 300 can determine the pole/barrier classification on either side of the vehicle, i.e., left/driver side or right/passenger side. In other words, unlike the side impact determination 200 of FIG. 6, which is left/driver side specific, the pole/barrier classification algorithm 300 of FIG. 7 applies to both sides of the vehicle The pole/barrier classification algorithm 300 determines a pole threshold use classification, shown at 340, based on two metrics, as shown at OR gate 332. Those metrics include determinations made by an SSS pole/barrier classification metric 310 an ACU pole/barrier classification metric 320, and a side impact first/second row classification metric 330.

SSS Pole/Barrier Classification Metric

The SSS pole/barrier classification metric 310 compares the SSS X-axis relative velocity (SSS_X_Rel_Vel) to the SSS Y-axis relative velocity (SSS_Y_Rel_Vel), based on the SSS X and Y axis accelerations SSS_X and SSS_Y measured by the satellite safety sensor SSS 150. The SSS pole/barrier classification metric 310 defines zones on the left side of the vehicle and the right side of the vehicle within which the crash event is classified. These zones, which are shown in dashed lines, include a barrier zone, a pole zone, and a default zone.

The zone in which the SSS pole/barrier classification metric 310 classifies the side impact depends on the zone that the metric enters or falls within. If the metric comparing SSS_X_Rel_Vel to SSS_Y_Rel_Vel enters or falls within the right side pole zone or the left side pole zone, the classification indicates a pole event as a Boolean output (Pole=ON or 1). If the metric comparing SSS_X_Rel_Vel to SSS_Y_Rel_Vel enters or falls within the right side barrier zone or the left side barrier zone, the classification indicates a barrier event as a Boolean output (Barrier=OFF or 0).

By way of example in FIG. 7, the SSS pole/barrier classification metric 310 includes dashed lines that represents example metrics comparing SSS_X_Rel_Vel to SSS_Y_Rel_Vel. These example metrics represent example determinations of the SSS pole/barrier classification metric 310, i.e., right side barrier zone events, right side pole zone events, left side barrier zone events, and left side pole zone events. As shown, the example barrier zone metrics would produce a Boolean OFF or 0 from the SSS pole/barrier classification metric 310, and the example pole zone metrics would produce a Boolean ON or 1 from the SSS pole/barrier classification metric 310.

The default zones of the metric 310 shown in FIG. 7 are similar to or can be compared to an initial state of the metric 310. All classifications determined by the metric 310 begin or go through the default zone, that is, if the first point of the metric value enters the classification zone, the previous point must be in default zone.

ACU Pole/Barrier Classification Metric

The ACU pole/barrier classification metric 320 compares the ACU_X-axis relative velocity (ACU_X_Rel_Vel) to the ACU_Y-axis relative velocity (ACU_Y_Rel_Vel), based on the ACU_X and Y axis accelerations ACU_X and ACU_Y measured by the airbag control unit ACU 150. The ACU pole/barrier classification metric 320 defines zones on the left side of the vehicle and the right side of the vehicle within which the crash event is classified. These zones, which are shown in dashed lines, include a barrier zone, a pole zone, and a default zone.

The zone in which the ACU pole/barrier classification metric 320 classifies the side impact depends on the zone that the metric enters or falls within. If the metric comparing ACU_X_Rel_Vel to ACU_Y_Rel_Vel enters or falls within the right side pole zone or the left side pole zone, the classification indicates a pole event as a Boolean output (Pole=ON or 1). If the metric comparing ACU_X_Rel_Vel to ACU_Y_Rel_Vel enters or falls within the right side barrier zone or the left side barrier zone, the classification indicates a barrier event as a Boolean output (Barrier=OFF or 0).

By way of example in FIG. 7, the ACU pole/barrier classification metric 320 includes dashed lines that represents example metrics comparing ACU_X_Rel_Vel to ACU_Y_Rel_Vel. These example metrics represent four example determinations of the ACU pole/barrier classification metric 320, i.e., a right side barrier zone events, right side pole zone events, left side barrier zone events, and left side pole zone events. As shown, the example barrier zone metrics would produce a Boolean OFF or 0 from the ACU pole/barrier classification metric 310, and the example pole zone metrics would produce a Boolean ON or 1 from the ACU pole/barrier classification metric 320.

The default zones of the metric 320 shown in FIG. 7 are similar to or can be compared to an initial state of the metric 320. All classifications determined by the metric 320 begin or go through the default zone, that is, if the first point of the metric value enters the classification zone, the previous point must be in default zone.

Side Impact First/Second Row Classification Algorithm

The side impact first/second row classification metric 330 classifies a pole side impact as either a front side impact or a rear side pole impact. The side impact first/second row classification metric 330 produces a single output indicative of whether a side impact is a front side impact or a rear side impact. The side impact first/second row classification metric 330 output is OFF or 0 for a front side impact detected (i.e., no rear side pole impact detected), and ON or 1 for rear side pole impact detected.

The side impact first/second row classification metric 330 is used to classify the first row side impact from the second row side impact. Since the first row side impact crash events include the barrier and pole impact, the second row side impact crash events include only pole impact events. Therefore, this metric can separate the rear side pole events from the front side pole or front barrier events.

The side impact first/second row classification metric 330 utilizes data from the ACU 120 and the SSS 150, specifically, the SSS Y-axis relative velocity SSS_Y_Rel_Vel, and the ACU_Y-axis relative velocity ACU_Y_Rel_Vel. As shown, side impact first/second row classification metric 330 has default zone, a rear side pole impact zone, and a front side pole or front barrier impact zone, which are defined by solid threshold lines in FIG. 7. If the side impact first/second row classification metric 330 enters the rear side pole impact zone, the output is a Boolean ON or 1, indicating that a rear side pole impact is detected. If the side impact first/second row classification metric 330 enters the front side pole or front barrier impact zone, the output is a Boolean OFF or 0, indicating that a front side pole or front barrier impact is detected. The default zone of the side impact first/second row classification metric 330 defaults to a Boolean OFF or 0.

By way of example in FIG. 7, the side impact first/second row classification metric 330 includes two dashed lines that represents example metrics comparing SSS_Y_Rel_Vel to ACU_Y_Rel_Vel. These example metrics represent two example determinations of the side impact first/second row classification metric 330, i.e., a rear side pole impact and a non-rear side impact, such as a front side pole or front barrier impact. As shown, the example metrics that entered the rear side pole impact zone trigger a Boolean ON or 1 output of the side impact first/second row classification metric 330. The example metrics that remain below the rear side pole impact zone trigger a Boolean OFF or 0 output of the side impact first/second row classification metric 330. It does not matter that both example metrics enter the front side pole or front barrier impact zone. As long as a metric enters the rear side pole impact zone at any time, the Boolean ON or 1 is triggered and the side impact first/second row classification metric 330 is set to ON or 1.

As shown, the side impact first/second row classification metric 330 utilizes SSS_Y_Rel_Vel and ACU_Y_Rel_Vel to split the rear side pole impact event from the front side pole or front barrier impact event. This is because, in the event of a rear pole impact, the SSS 150 will see a resulting acceleration that is greater than that experienced by the ACU 120. Conversely, in the event of a frontimpact, the ACU 120 will see a resulting acceleration that is greater than that experienced by the SSS 150.

As shown by the OR gate 332, the pole threshold use classification 340 is ON (Boolean 1) when of the SSS pole/barrier classification metric 310 is ON, the ACU pole/barrier classification metric 320 is ON, or the side impact first/second row classification metric 330 is ON.

From the above, it will be appreciated that the pole/barrier classification algorithm 300 utilizes X-axis and Y-axis relative velocities measured at the ACU 120 and SSS 150 to split the side impact event into front and rear barrier and pole zones. This is because a pole impact is a high intrusion, low acceleration event, whereas a barrier impact is a lower intrusion, high acceleration event. Utilizing the ACU 120 and SSS 150 for these metrics is advantageous because they are centrally located along the Y-axis of the vehicle and therefore experience accelerations primarily of the vehicle in response to side impacts. This is opposed to the B-pillar mounted sensors LBP_SIS 130 and RBP_SIS 140, which are directly affected by the side impact because the B-pillars typically undergo some deformation in response to a side impact.

For a barrier side impact, the ACU 120 and SSS 150 will see a resulting acceleration that has a high magnitude in the Y-axis direction when compared to a pole side impact. This is illustrated by the SSS pole/barrier classification metrics 310, the ACU pole/barrier classification metrics 320, and the side impact first/second row classification metric 330, which show that the pole/barrier zone classification is determined by the comparative magnitudes of the Y-axis axis acceleration/velocity.

First and Second Row Side Impact Discrimination Algorithm

Figure 8:
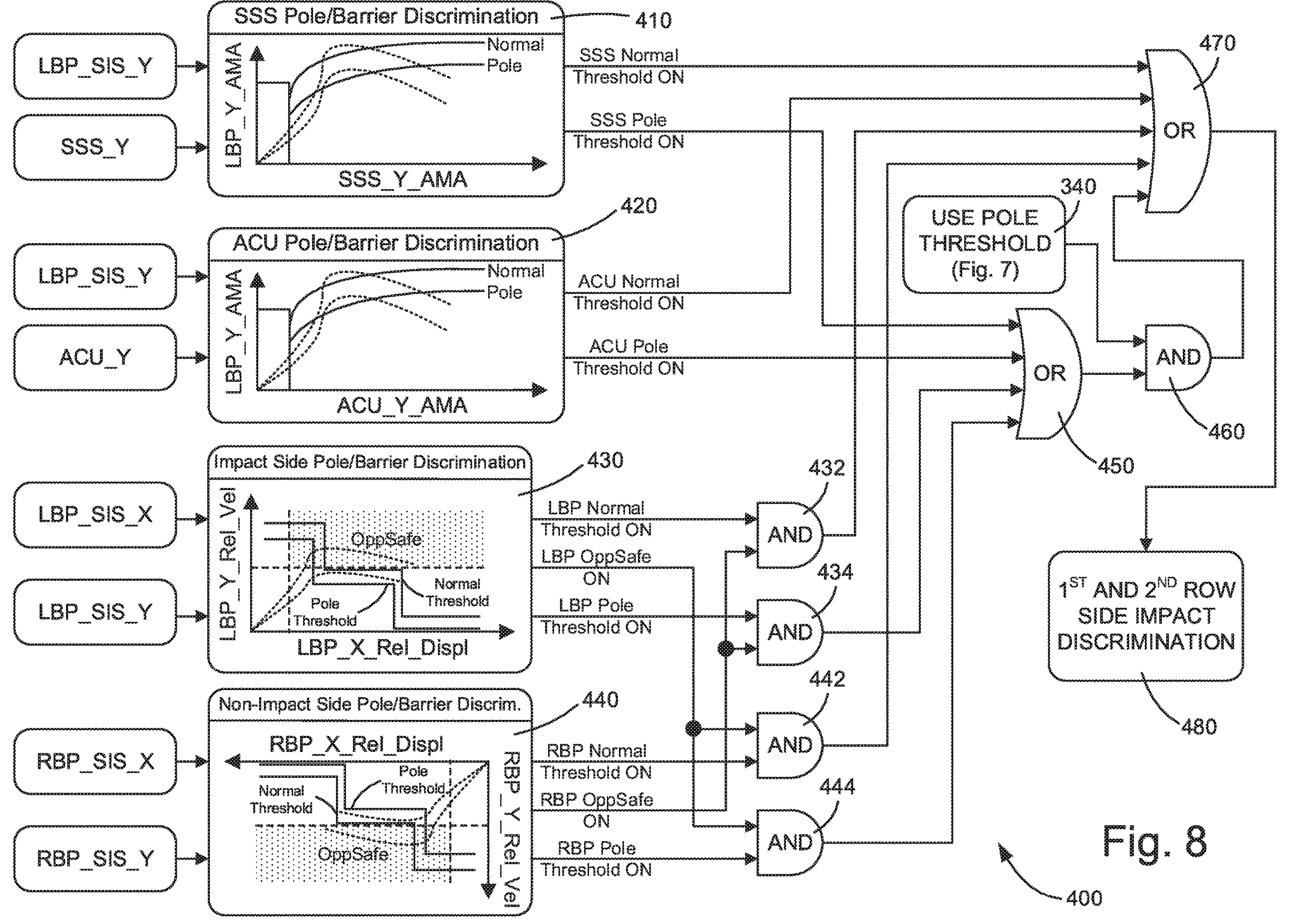
FIG. 8 is a schematic block diagram depicting a first and second row side impact discrimination algorithm implemented by the vehicle safety system.

According to one example configuration/implementation of the vehicle safety system 100, FIG. 8 illustrates a first and second row side impact discrimination algorithm 400 utilizing the ACU 120, the LBP_SIS 130, the RBP_SIS 140, and the SSS 150. The first and second row side impact discrimination algorithm 400 can, for example, be implemented in the ACU 120 of the vehicle safety system 100. The first and second row side impact discrimination algorithm 400 determines whether discrimination is on for both the first and second row safety devices, i.e., normal or pole threshold is ON. Further discrimination (see FIGS. 9 and 10) further discriminates front and rear pole events.

The first and second row side impact discrimination algorithm 400 implements a SSS pole/barrier discrimination metric 410, an ACU pole/barrier discrimination metric 420, an impact side pole/barrier discrimination metric 430, and a non-impact side pole/barrier discrimination metric 440.

SSS Pole/Barrier Discrimination Metric

The SSS pole/barrier discrimination metric 410 produces two outputs: an SSS Normal Threshold output and an SSS Pole Threshold output. The SSS Normal Threshold output is a Boolean output for which OFF or 0=normal threshold not met, and for which ON or 1=normal threshold met. Normal threshold met=ON or 1 would indicate at least a normal or barrier side impact event. Similarly, the SSS Pole Threshold output is a Boolean output for which OFF or 0=pole threshold not met, and for which ON or 1=pole threshold met. Pole threshold met=ON or 1 indicates a pole side impact event.

The SSS pole/barrier discrimination metric 410 utilizes data from the LBP_SIS 130 and the SSS 150, specifically, the left B-pillar Y-axis acceleration LBP_Y_AMA and the SSS Y-axis acceleration SSS_Y_AMA. As shown, the SSS pole/barrier metric 410 has a threshold zone represented by a solid rectangular line. Normal and Pole thresholds, represented by solid, curved lines and labeled as such in FIG. 8, extend from the threshold zone. Inside the rectangular threshold zone, both the SSS normal threshold and the SSS pole threshold are OFF or 0. If the SSS pole/barrier discrimination metric 410 exceeds the Pole threshold, the SSS pole threshold=ON or 1. If the SSS pole/barrier discrimination metric 410 exceeds the Normal threshold, the SSS pole threshold=ON or 1.

By way of example in FIG. 8, the SSS pole/barrier discrimination metric 410 includes two dashed lines that represents example metrics comparing LBP_Y_AMA to SSS_Y_AMA. These example metrics represent two example determinations of the SSS pole/barrier discrimination metric 410, i.e., a normal threshold event and a pole threshold event. As shown, the example metrics that exceed the normal threshold (upper solid line) would produce a Boolean ON from the SSS Normal threshold output. The example metrics that exceed only the pole threshold would produce a Boolean ON from the SSS Pole threshold output. The example metrics that exceed both the normal threshold and the pole threshold would produce a Boolean ON from both the SSS normal threshold output and the SSS pole threshold output.

ACU Pole/Barrier Discrimination Metric

The ACU pole/barrier discrimination metric 420 produces two outputs: an ACU Normal Threshold output and an ACU Pole Threshold output. The ACU Normal Threshold output is a Boolean output for which OFF or 0=normal threshold not met, and for which ON or 1=normal threshold met. Normal threshold met=ON or 1 would indicate at least a normal or barrier side impact event. Similarly, the ACU Pole Threshold output is a Boolean output for which OFF or 0=pole threshold not met, and for which ON or 1=pole threshold met. Pole threshold met=ON or 1 indicates a pole side impact event.

The ACU pole/barrier discrimination metric 420 utilizes data from the LBP_SIS 130 and the ACU 150, specifically, the left B-pillar Y-axis acceleration LBP_Y_AMA and the ACU_Y-axis acceleration ACU_Y_AMA. As shown, the ACU pole/barrier metric 420 has a threshold zone represented by a solid rectangular line. Normal and Pole thresholds, represented by solid, curved lines and labeled as such in FIG. 8, extend from the threshold zone. Inside the rectangular threshold zone, both the ACU normal threshold and the ACU pole threshold are OFF or 0. If the ACU pole/barrier discrimination metric 420 exceeds the Pole threshold, the ACU pole threshold=ON or 1. If the ACU pole/barrier discrimination metric 420 exceeds the Normal threshold, the ACU pole threshold=ON or 1.

By way of example in FIG. 8, the ACU pole/barrier discrimination metric 420 includes two dashed lines that represents example metrics comparing LBP_Y_AMA to ACU_Y_AMA. These example metrics represent two example determinations of the ACU pole/barrier discrimination metric 420, i.e., a normal threshold event and a pole threshold event. As shown, the example metrics that exceed the normal threshold (upper solid line) would produce a Boolean ON from the ACU normal threshold output. The example metrics that exceed only the pole threshold would produce a Boolean ON from the ACU pole threshold output. The example metrics that exceed both the normal threshold and the pole threshold would produce a Boolean ON from both the ACU normal threshold output and the ACU pole threshold output.

Impact Side Pole/Barrier Discrimination Metric

For the example configuration illustrated in the figures, the impact side pole/barrier discrimination metric 430 of FIG. 8 is a vehicle left side algorithm. Those skilled in the art will appreciate that the safety system 100 would also implement an identical but mirrored or flipped algorithm in which the vehicle right side is the impact side.

The impact side pole/barrier discrimination metric 430 produces three outputs: an LBP Normal Threshold output, an LBP Pole Threshold output, and an LBP OppSafe output. The LBP Normal Threshold output is a Boolean output for which OFF or 0=normal threshold not met, and for which ON or 1=normal threshold met. Normal threshold met=ON or 1 would indicate at least a normal or barrier side impact event. Similarly, the LBP Pole Threshold output is a Boolean output for which OFF or 0=pole threshold not met, and for which ON or 1=pole threshold met. Pole threshold met=ON or 1 indicates a pole side impact event. The LBP OppSafe output accounts for inadvertent firing in a misuse event (e.g., hammer blow test), as described above. The LBP OppSafe output is a Boolean output for which OFF or 0=safing not enabled, and for which ON or 1=safing enabled.

The impact side pole/barrier discrimination metric 430 utilizes data from the LBP_SIS 130, specifically, the left B-pillar Y-axis relative velocity LBP_Y_Rel_Vel and the left B-pillar X-axis relative displacement LBP_X_Rel_Displ. As shown, the impact side pole/barrier discrimination metric 430 has a normal threshold zone and a pole threshold zone, each of which is represented by a stepped solid line. If the impact side pole/barrier discrimination metric 430 exceeds the pole threshold, the LBP pole threshold=ON or 1. If the impact side pole/barrier discrimination metric 430 exceeds the normal threshold, the LBP normal threshold=ON or 1.

The impact side pole/barrier discrimination metric 430 has an OppSafe zone, which is represented by a rectangular region. The OppSafe zone defines threshold LBP_Y_Rel_Vel and LBP_X_Rel_Displ values that trigger the LBP OppSafe output. If the impact side pole/barrier discrimination metric 430 fails to exceed one or both of these values and therefore does not enter the OppSafe zone, the LBP OppSafe=OFF or 0. If the impact side pole/barrier discrimination metric 430 exceeds both of these values and enters the OppSafe zone, the LBP OppSafe=ON or 1.

By way of example in FIG. 8, the impact side pole/barrier discrimination metric 430 includes two dashed lines that represents example metrics comparing LBP_Y_Rel_Vel to LBP_X_Rel_Displ. These example metrics represent two example determinations of the impact side pole/barrier discrimination metric 430, i.e., a vehicle left side normal threshold event and a pole threshold event. As shown, the example metrics that exceed the normal threshold (upper solid line) would produce a Boolean ON from the impact side normal threshold output. The example metrics that exceed only the pole threshold would produce a Boolean ON from the impact side pole threshold output. The example metrics that exceed both the normal threshold and the pole threshold would produce a Boolean ON from both the impact side normal threshold output and the impact side pole threshold output.

Additionally, as shown in FIG. 8, for the impact side pole/barrier discrimination metric 430, the example metric that exceeds only the pole threshold would not trigger the LBP OppSafe function, so LBP OppSafe=OFF or 0. The example metric that exceeds both the pole threshold and the normal threshold would trigger the LBP OppSafe function, so LBP OppSafe=ON or 1.

Non-Impact Side Pole/Barrier Discrimination Metric

For the example configuration illustrated in the figures, the non-impact side pole/barrier discrimination metric 440 of FIG. 8 is a vehicle right side algorithm. Those skilled in the art will appreciate that the safety system 100 would also implement an identical but mirrored or flipped algorithm in which the vehicle left side is the non-impact side, which is the case where the impact side is the vehicle right side.

The non-impact side pole/barrier discrimination metric 440 produces three outputs: an RBP Normal Threshold output, an RBP Pole Threshold output, and an RBP OppSafe output. The RBP Normal Threshold output is a Boolean output for which OFF or 0=normal threshold not met, and for which ON or 1=normal threshold met. Normal threshold met=ON or 1 would indicate at least a normal or barrier side impact event. Similarly, the RBP Pole Threshold output is a Boolean output for which OFF or 0=pole threshold not met, and for which ON or 1=pole threshold met. Pole threshold met=ON or 1 indicates a pole side impact event. The RBP OppSafe output accounts for inadvertent firing in a misuse event (e.g., hammer blow test), as described above. The RBP OppSafe output is a Boolean output for which OFF or 0=safing not enabled, and for which ON or 1=safing enabled.

The non-impact side pole/barrier discrimination metric 440 utilizes data from the RBP_SIS 140, specifically, the right B-pillar Y-axis relative velocity RBP_Y_Rel_Vel and the right B-pillar X-axis relative displacement RBP_X_Rel_Displ. As shown, the non-impact side pole/barrier discrimination metric 440 has a normal threshold zone and a pole threshold zone, each of which is represented by a stepped solid line. If the non-impact side pole/barrier discrimination metric 440 exceeds the pole threshold, the RBP pole threshold=ON or 1. If the non-impact side pole/barrier discrimination metric 440 exceeds the normal threshold, the RBP normal threshold=ON or 1.

The non-impact side pole/barrier discrimination metric 440 has an OppSafe zone, which is represented by a rectangular region. The OppSafe zone defines threshold RBP_Y_Rel_Vel and RBP_X_Rel_Displ values that trigger the RBP OppSafe output. If the non-impact side pole/barrier discrimination metric 440 fails to exceed one or both of these values and therefore does not enter the OppSafe zone, the RBP OppSafe=OFF or 0. If the non-impact side pole/barrier discrimination metric 440 exceeds both of these values and enters the OppSafe zone, the RBP OppSafe=ON or 1.

By way of example in FIG. 8, the non-impact side pole/barrier discrimination metric 440 includes two dashed lines that represents example metrics comparing RBP_Y_Rel_Vel to RBP_X_Rel_Displ. These example metrics represent two example determinations of the non-impact side pole/barrier discrimination metric 440, i.e., a vehicle right side normal threshold event and a pole threshold event. As shown, the example metrics that exceed the normal threshold (upper solid line) would produce a Boolean ON from the non-impact side normal threshold output. The example metrics that exceed only the pole threshold would produce a Boolean ON from the non-impact side pole threshold output. The example metrics that exceed both the normal threshold and the pole threshold would produce Boolean ON from both the non-impact side normal threshold output and the non-impact side pole threshold output.

Additionally, as shown in FIG. 8, for the non-impact side pole/barrier discrimination metric 430, the example metric that exceeds only the pole threshold would not trigger the RBP OppSafe function, so RBP OppSafe=OFF or 0. The example metric that exceeds both the pole threshold and the normal threshold would trigger the RBP OppSafe function, so RBP OppSafe=ON or 1.

First and Second Row Side Impact Discrimination Logic

The first and second row side impact discrimination algorithm 400 implements Boolean logic that determines the state of the first and second row side impact discrimination 480 based on the Boolean outputs of the SSS pole/barrier discrimination metric 410, ACU pole/barrier discrimination metric 420, impact side pole/barrier discrimination metric 430, and the non-impact side pole/barrier discrimination metric 440. The state of the first and second row side impact discrimination 480 will be ON or 1 if any of the conditions inputted into OR gate 470 are ON or 1. These conditions are as follows:

- SSS Normal Threshold=ON (see SSS Pole/Barrier Discrimination Metric 410).
- ACU Normal Threshold=ON (see ACU Pole/Barrier Discrimination Metric 420).
- LBP Normal Threshold=ON and RBP OppSafe=ON (see AND gate 432).
- RBP Normal Threshold=ON and LBP OppSafe=ON (see AND gate 442).
- AND gate 460=ON (see below).

The Boolean state of AND gate 460 is ON or 1 if the Use Pole Threshold=ON or 1 (see 340 FIG. 7) and any of the following conditions inputted into OR gate 450 are ON or 1:

- SSS Pole Threshold=ON (see SSS Pole/Barrier Discrimination Metric 410).
- ACU Pole Threshold=ON (see ACU Pole/Barrier Discrimination Metric 420).
- LBP Pole Threshold=ON and RBP OppSafe=ON (see AND gate 434).
- RBP Pole Threshold=ON and LBP OppSafe=ON (see AND gate 444).

As set forth above, the first and second row side impact discrimination 480 determines whether a side impact event can be discriminated as being a pole or barrier side impact of a magnitude sufficient to trigger deployment of first and second row side impact protection devices, such as side airbags and/or curtain airbags. When the first and second row side impact discrimination 480 is ON or 1, first and second row side impact protection devices will be enabled and deployed. Advantageously, the first and second row side impact discrimination algorithm 400 can discriminate the occurrence of a pole impact, which otherwise would not be classified as meeting the normal threshold.

From the above description of the invention, those skilled in the art will perceive improvements, changes and modifications. Such improvements, changes, and/or modifications within the skill of the art are intended to be covered by the appended claims.

Having described the invention, the following is claimed:

1. A method for controlling an actuatable safety device for helping to protect a vehicle occupant, the method comprising:

sensing a plurality of multi-axis vehicle acceleration parameters comprising a longitudinal vehicle acceleration parameter and a lateral vehicle acceleration parameter;

executing one or more metrics that evaluate the multi-axis vehicle acceleration parameters to determine whether vehicle crash thresholds are exceeded and producing crash event indications in response thereto;

evaluating the crash event indications to identify a pole side impact crash event, wherein identifying a pole side impact crash event comprises discriminating the pole side impact crash event from a barrier side impact crash event, wherein discriminating the pole side impact crash event from the barrier side impact crash event comprises evaluating crash event indications determined from multi-axis vehicle acceleration parameters measured from a non-impact side of the vehicle; and controlling deployment of the actuatable safety device in response to identifying the pole side impact crash event;

wherein discriminating the pole side impact crash event from the barrier side impact crash event further comprises:

measuring via a satellite safety sensor (SSS) a vehicle X-axis acceleration (SSS_X) and a vehicle Y-axis acceleration (SSS_Y);

determining from the SSS_X a vehicle X-axis relative velocity (SSS_X_Rel_Vel);

determining from the SSS_Y a vehicle Y-axis relative velocity (SSS_Y_Rel_Vel); and comparing the SSS_X_Rel_Vel to the SSS_Y_Rel_Vel to classify a side impact crash event as being either a pole side impact crash event or a barrier side impact crash event;

and wherein comparing the SSS_X_Rel_Vel to the SSS_Y_Rel_Vel to classify a side impact crash event as being either a pole side impact crash event or a barrier side impact crash event comprises:

classifying the side impact crash event as a barrier side impact crash event in response to determining a comparatively high said SSS_Y_Rel_Vel in relation to the SSS_X_Rel_Vel; and classifying the side impact crash event as a pole side impact crash event in response to determining a comparatively low said SSS_Y_Rel_Vel in relation to the SSS_X_Rel_Vel.

2. A vehicle safety system comprising:

one or more vehicle safety devices; and a controller configured to execute the method recited in claim 1 and to actuate the one or more vehicle safety devices in response thereto.

3. The vehicle safety system recited in claim 2, further comprising:

a left B-pillar side impact sensor (LBP_SIS) configured to be mounted on a left B-pillar of a vehicle;

a right B-pillar side impact sensor (RBP_SIS) configured to be mounted on a right B-pillar of the vehicle;

a satellite safety sensor (SSS) configured to be mounted in a roof of the vehicle along a vehicle Y-axis above rear row seating in the vehicle; and an airbag control unit (ACU) configured to be mounted in an instrument panel of the vehicle along the vehicle Y-axis, wherein the controller is implemented in the ACU and wherein the LBP_SIS, RBP_SIS, and SSS are configured to communicate with the ACU.

4. The vehicle safety system recited in claim 2, wherein the one or more vehicle safety devices comprise at least one of a side airbag and a curtain airbag.

5. A method for controlling an actuatable safety device for helping to protect a vehicle occupant, the method comprising:

sensing a plurality of multi-axis vehicle acceleration parameters comprising a longitudinal vehicle acceleration parameter and a lateral vehicle acceleration parameter;

executing one or more metrics that evaluate the multi-axis vehicle acceleration parameters to determine whether vehicle crash thresholds are exceeded and producing crash event indications in response thereto;

evaluating the crash event indications to identify a pole side impact crash event, wherein identifying a pole side impact crash event comprises discriminating the pole side impact crash event from a barrier side impact crash event, wherein discriminating the pole side impact crash event from the barrier side impact crash event comprises evaluating crash event indications determined from multi-axis vehicle acceleration parameters measured from a non-impact side of the vehicle; and controlling deployment of the actuatable safety device in response to identifying the pole side impact crash event, wherein discriminating the pole side impact crash event from the barrier side impact crash event further comprises:

measuring via an airbag control unit (ACU) a vehicle X-axis acceleration (ACU_X) and a vehicle Y-axis acceleration (ACU_Y);

determining from the ACU_X a vehicle X-axis relative velocity (ACU_X_Rel_Vel);

determining from the ACU_Y a vehicle Y-axis relative velocity (ACU_Y_Rel_Vel); and comparing the ACU_X_Rel_Vel to the ACU_Y_Rel_Vel to discriminate the pole side impact crash event from the barrier side impact crash event.

6. The method recited in claim 5, wherein comparing the ACU_X_Rel_Vel to the ACU_Y_Rel_Vel to classify a side impact crash event as a pole side impact crash event or a barrier side impact crash event comprises:

classifying the side impact crash event as a barrier side impact crash event in response to determining a comparatively high said ACU_Y_Rel_Vel in relation to the ACU_X_Rel_Vel; and classifying the side impact crash event as a pole side impact crash event in response to determining a comparatively low said ACU_Y_Rel_Vel in relation to the ACU_X_Rel_Vel.

7. A vehicle safety system comprising:

one or more vehicle safety devices; and a controller configured to execute the method recited in claim 5 and to actuate the one or more vehicle safety devices in response thereto.

8. The vehicle safety system recited in claim 7, further comprising:

a left B-pillar side impact sensor (LBP_SIS) configured to be mounted on a left B-pillar of a vehicle;

a right B-pillar side impact sensor (RBP_SIS) configured to be mounted on a right B-pillar of the vehicle;

a satellite safety sensor (SSS) configured to be mounted in a roof of the vehicle along a vehicle Y-axis above rear row seating in the vehicle; and an airbag control unit (ACU) configured to be mounted in an instrument panel of the vehicle along the vehicle Y-axis, wherein the controller is implemented in the ACU and wherein the LBP_SIS, RBP_SIS, and SSS are configured to communicate with the ACU.

9. The vehicle safety system recited in claim 7, wherein the one or more vehicle safety devices comprise at least one of a side airbag and a curtain airbag.

10. A method for controlling an actuatable safety device for helping to protect a vehicle occupant, the method comprising:

sensing a plurality of multi-axis vehicle acceleration parameters comprising a longitudinal vehicle acceleration parameter and a lateral vehicle acceleration parameter;

executing one or more metrics that evaluate the multi-axis vehicle acceleration parameters to determine whether vehicle crash thresholds are exceeded and producing crash event indications in response thereto;

evaluating the crash event indications to identify a pole side impact crash event, wherein identifying a pole side impact crash event comprises discriminating the pole side impact crash event from a barrier side impact crash event, wherein discriminating the pole side impact crash event from the barrier side impact crash event comprises evaluating crash event indications determined from multi-axis vehicle acceleration parameters measured from a non-impact side of the vehicle; and controlling deployment of the actuatable safety device in response to identifying the pole side impact crash event, wherein discriminating the pole side impact crash event from the barrier side impact crash event comprises:

measuring via an impact side sensor (LBP_SIS) an impact side X-axis acceleration (LBP_SIS_X) and an impact side Y-axis acceleration (LBP_SIS_Y);

determining from the LBP_SIS_X an impact side X-axis relative displacement (LBP_X_Rel_Displ);

determining from the LBP_SIS_Y an impact side Y-axis relative velocity (LBP_Y_Rel_Vel); and comparing the LBP_X_Rel_Displ to the LBP_Y_Rel_Vel to classify a side impact crash event as a pole side impact crash event or a barrier side impact crash event on the impact side of the vehicle.

11. The method recited in claim 10, wherein comparing the LBP_X_Rel_Displ to the LBP_Y_Rel_Vel to classify a side impact crash event as a pole side impact crash event or a barrier side impact crash event on the impact side of the vehicle comprises:

classifying the side impact crash event as a barrier side impact crash event in response to determining that the compared LBP_X_Rel_Displ to LBP_Y_Rel_Vel exceeds a normal threshold; and classifying the side impact crash event as a pole side impact crash event in response to determining that the compared LBP_X_Rel_Displ to LBP_Y_Rel_Vel exceeds a pole threshold.

12. The method recited in claim 11, wherein comparing the LBP_X_Rel_Displ to the LBP_Y_Rel_Vel to classify a side impact crash event as a pole side impact crash event or a barrier side impact crash event further comprises determining whether a safing function for a non-impact side of the vehicle permits the classification.

13. A vehicle safety system comprising:

one or more vehicle safety devices; and a controller configured to execute the method recited in claim 7 and to actuate the one or more vehicle safety devices in response thereto.

14. The vehicle safety system recited in claim 13, further comprising:

a left B-pillar side impact sensor (LBP_SIS) configured to be mounted on a left B-pillar of a vehicle;

a right B-pillar side impact sensor (RBP_SIS) configured to be mounted on a right B-pillar of the vehicle;

a satellite safety sensor (SSS) configured to be mounted in a roof of the vehicle along a vehicle Y-axis above rear row seating in the vehicle; and an airbag control unit (ACU) configured to be mounted in an instrument panel of the vehicle along the vehicle Y-axis, wherein the controller is implemented in the ACU and wherein the LBP_SIS, RBP_SIS, and SSS are configured to communicate with the ACU.

15. The vehicle safety system recited in claim 13, wherein the one or more vehicle safety devices comprise at least one of a side airbag and a curtain airbag.

16. A method for controlling an actuatable safety device for helping to protect a vehicle occupant, the method comprising:

sensing a plurality of multi-axis vehicle acceleration parameters comprising a longitudinal vehicle acceleration parameter and a lateral vehicle acceleration parameter;

executing one or more metrics that evaluate the multi-axis vehicle acceleration parameters to determine whether vehicle crash thresholds are exceeded and producing crash event indications in response thereto;

evaluating the crash event indications to identify a pole side impact crash event, wherein identifying a pole side impact crash event comprises discriminating the pole side impact crash event from a barrier side impact crash event, wherein discriminating the pole side impact crash event from the barrier side impact crash event comprises evaluating crash event indications determined from multi-axis vehicle acceleration parameters measured from a non-impact side of the vehicle; and controlling deployment of the actuatable safety device in response to identifying the pole side impact crash event, wherein discriminating the pole side impact crash event from the barrier side impact crash event comprises:

measuring via an non-impact side sensor (RBP_SIS) an non-impact side X-axis acceleration (RBP_SIS_X) and an non-impact side Y-axis acceleration (RBP_SIS_Y);

determining from the RBP_SIS_X a non-impact side X-axis relative displacement (RBP_X_Rel_Displ);

determining from the RBP_SIS_Y a non-impact side Y-axis relative velocity (RBP_Y_Rel_Vel); and comparing the RBP_X_Rel_Displ to the RBP_Y_Rel_Vel to classify a side impact crash event as a pole side impact crash event or a barrier side impact crash event on the impact side of the vehicle.

17. The method recited in claim 16, wherein comparing the RBP_X_Rel_Displ to the RBP_Y_Rel_Vel to classify a side impact crash event as a pole side impact crash event or a barrier side impact crash event on the impact side of the vehicle comprises:

classifying the side impact crash event as a barrier side impact crash event in response to determining that the compared RBP_X_Rel_Displ to RBP_Y_Rel_Vel exceeds a normal threshold; and classifying the side impact crash event as a pole side impact crash event in response to determining that the compared RBP_X_Rel_Displ to RBP_Y_Rel_Vel exceeds a pole threshold.

18. The method recited in claim 17, wherein comparing the RBP_X_Rel_Displ to the RBP_Y_Rel_Vel to classify a side impact crash event as a pole side impact crash event or a barrier side impact crash event further comprises determining whether a safing function for an impact side of the vehicle permits the classification.

19. A vehicle safety system comprising:

one or more vehicle safety devices; and a controller configured to execute the method recited in claim 10 and to actuate the one or more vehicle safety devices in response thereto.

20. The vehicle safety system recited in claim 19, further comprising:

a left B-pillar side impact sensor (LBP_SIS) configured to be mounted on a left B-pillar of a vehicle;

a right B-pillar side impact sensor (RBP_SIS) configured to be mounted on a right B-pillar of the vehicle;

a satellite safety sensor (SSS) configured to be mounted in a roof of the vehicle along a vehicle Y-axis above rear row seating in the vehicle; and an airbag control unit (ACU) configured to be mounted in an instrument panel of the vehicle along the vehicle Y-axis, wherein the controller is implemented in the ACU and wherein the LBP_SIS, RBP_SIS, and SSS are configured to communicate with the ACU.

21. The vehicle safety system recited in claim 19, wherein the one or more vehicle safety devices comprise at least one of a side airbag and a curtain airbag.

22. A method for controlling an actuatable safety device for helping to protect a vehicle occupant, the method comprising:

sensing a plurality of multi-axis vehicle acceleration parameters comprising a longitudinal vehicle acceleration parameter and a lateral vehicle acceleration parameter;

executing one or more metrics that evaluate the multi-axis vehicle acceleration parameters to determine whether vehicle crash thresholds are exceeded and producing crash event indications in response thereto;

evaluating the crash event indications to identify a pole side impact crash event, wherein identifying a pole side impact crash event comprises discriminating the pole side impact crash event from a barrier side impact crash event, wherein discriminating the pole side impact crash event from the barrier side impact crash event comprises evaluating crash event indications determined from multi-axis vehicle acceleration parameters measured from a non-impact side of the vehicle; and controlling deployment of the actuatable safety device in response to identifying the pole side impact crash event, wherein identifying the pole side impact crash event comprises discriminating a rear pole side impact crash event from a front side pole impact crash event and a barrier side impact crash event;

wherein discriminating the rear pole side impact crash event from a front side pole impact crash event and a barrier side impact crash event comprises:

measuring via a satellite safety sensor (SSS) a vehicle Y-axis acceleration (SSS_Y);

measuring via an airbag ECU (ACU) a vehicle Y-axis acceleration (ACU_Y);

determining from the SSS_Y a vehicle Y-axis relative velocity (SSS_Y_Rel_Vel);

determining from the ACU_Y a vehicle Y-axis relative velocity (ACU_Y_Rel_Vel); and comparing the SSS_Y_Rel_Vel to the ACU_Y_Rel_Vel to classify a side impact crash event as rear pole side impact crash or a front side impact crash event;

and wherein comparing the SSS_Y_Rel_Vel to the ACU_Y_Rel_Vel to classify a side impact crash event as rear pole side impact crash or a front side impact crash event comprises:

classifying the side impact crash event as a rear pole side impact crash event in response to determining a comparatively high SSS_Y_Rel_Vel in relation to the ACU_Y_Rel_Vel; and classifying the side impact crash event as a front pole side impact crash event in response to determining a comparatively low SSS_Y_Rel_Vel in relation to the ACU_Y_Rel_Vel.

23. A vehicle safety system comprising:

one or more vehicle safety devices; and a controller configured to execute the method recited in claim 13 and to actuate the one or more vehicle safety devices in response thereto.

24. The vehicle safety system recited in claim 23, further comprising:

a left B-pillar side impact sensor (LBP_SIS) configured to be mounted on a left B-pillar of a vehicle;

a right B-pillar side impact sensor (RBP_SIS) configured to be mounted on a right B-pillar of the vehicle;

a satellite safety sensor (SSS) configured to be mounted in a roof of the vehicle along a vehicle Y-axis above rear row seating in the vehicle; and an airbag control unit (ACU) configured to be mounted in an instrument panel of the vehicle along the vehicle Y-axis, wherein the controller is implemented in the ACU and wherein the LBP_SIS, RBP_SIS, and SSS are configured to communicate with the ACU.

25. The vehicle safety system recited in claim 23, wherein the one or more vehicle safety devices comprise at least one of a side airbag and a curtain airbag.

* * * * *